(12) United States Patent
Misawa et al.

(10) Patent No.: US 7,162,430 B2
(45) Date of Patent: Jan. 9, 2007

(54) INFORMATION PROCESSING METHOD AND SYSTEM AS TO EVALUATION INFORMATION

(75) Inventors: Tomohisa Misawa, Kawasaki (JP); Fusayuki Kuniyoshi, Naha (JP); Michihiko Taira, Naha (JP)

(73) Assignee: Fujitsu Limited, Kawasaki (JP)

( * ) Notice: Subject to any disclaimer, the term of this patent is extended or adjusted under 35 U.S.C. 154(b) by 597 days.

(21) Appl. No.: 10/125,513

(22) Filed: Apr. 19, 2002

(65) Prior Publication Data

US 2003/0144861 A1 Jul. 31, 2003

(30) Foreign Application Priority Data

Jan. 31, 2002 (JP) ............................. 2002-024501

(51) Int. Cl.
*G06Q 99/00* (2006.01)
(52) U.S. Cl. .............................. 705/1; 705/14
(58) Field of Classification Search ................ 705/1, 705/10, 14
See application file for complete search history.

(56) References Cited

U.S. PATENT DOCUMENTS

| 6,405,175 | B1 * | 6/2002 | Ng | 705/14 |
| 6,760,731 | B1 * | 7/2004 | Huff | 707/101 |

FOREIGN PATENT DOCUMENTS

| JP | 2000-207458 | | 7/2000 |
| JP | 2002-024519 | | 1/2002 |
| JP | 2002-056024 | | 2/2002 |
| KR | 2002062528 | * | 7/2002 |

OTHER PUBLICATIONS no author, Symantec Launches Customer Reward Program; Nov. 1997; PRNewswire; dialog copy 2 pages.*
Nagano, Hiroko; "Grade Ec Sites Immediately After Shopping, and Open Ratings By Consumers To The Public"; Dec. 15, 1999; pp. 166-169; Nikkei Net Business, No. 54; Japan, Nikkei Business Publications, Inc.

(Continued)

*Primary Examiner*—Thomas A. Dixon
(74) *Attorney, Agent, or Firm*—Staas & Halsey LLP

(57) ABSTRACT

This invention is to provide a technique enabling to efficiently collect effectiveness information as to evaluation information for evaluation objects, with reliability. An informant tourist A registers recommendation information of a tourist resort to an information broker C. The information broker C opens registered evaluation information to the public through the Internet. An information utilizing tourist B accesses to a web site of the information broker C and looks for his or her favorite store. The information utilizing tourist B finds evaluation information registered by the informant tourist A and goes to a tourist resort store D of its evaluation object. The information utilizing tourist B negotiates a deal about benefits with the tourist resort store D. If the negotiation is concluded, the deal is concluded, and then, the information utilizing tourist B causes a display device of a cellular phone to display a screen for inputting a password of the tourist resort store D and prompts to input its password. The tourist resort store D inputs and sends its password to the information broker C. This is not only a proof that the deal was concluded but also that a convincing proof that the deal was concluded based on the evaluation information of the informant tourist A. Namely, it is a proof that the evaluation information of the informant tourist A is reliable and was utilized effectively. If the deal is concluded, the tourist resort store D pays a commission to the information broker C. The information broker C gives points to the informant tourist A and the information utilizing tourist B.

17 Claims, 20 Drawing Sheets

OTHER PUBLICATIONS

Kubo, Hiroya; "A Study On Supporting Virtual Communities By Peer-Review Mechanisms"; IPSJ Symposium Series, vol. 2002 No. 1; Jan. 15, 2002 pp. 1-8; Japan, Information Processing Society of Japan.

Hirasawa, Shinichi; "Your Evaluation Determines Value of Product, Starting User Ratings On Web"; Mar. 20, 2000; p. 25; Nikkei Personal Computing, No. 357;Japan, Nikkei Business Publications, Inc.

Kamoshida, Akira; "Mirror Reflecting Voice From Consumer, BizRate, Financial e-business evolution"; Jan. 30, 2000, pp. 99-106; 1st edition; Japan, Nikkan Kogyo Simbun Ltd.

ASAHI Personal Computer, No. 239, The Asahi Shimbun Company, pp. 18-19, issued on Mar. 15, 1999.

Japanese Patent Office Action for Japanese Patent No. 2002-024501 (3 pages).

* cited by examiner

FIG. 3

| 111 | 112 | 113 | 114 | 115 | 116 | 117 | 118 | 119 |
|---|---|---|---|---|---|---|---|---|
| ID AND PW | CELLULAR TEL NO. | SUBSCRIBER ID | NAME | ADDRESS | BIRTHDAY | GENDER | MARRIAGE STATUS | HOME TEL NO. |

FIG. 4

| 120 | 121 | 122 | 123 | 124 | 125 | 126 | 127 | 128 | 129 |
|---|---|---|---|---|---|---|---|---|---|
| REG. FLAG | REG. NO. | PW | NAME | GPS INFO | TEL NO. | FAX NO. | TYPE | ADDRESS | AREA NAME |

FIG. 6

| 131 | 132 | 133 | 134 | | 135 |
|---|---|---|---|---|---|
| GPS VALUE (RANGE) | 1st TOURIST RESORT CANDIDATE NAME | 2nd TOURIST RESORT CANDIDATE NAME | 3rd TOURIST RESORT CANDIDATE NAME | ... | nth TOURIST RESORT CANDIDATE NAME |

| 141 | 142 | 143 |
|---|---|---|
| INDICATION NO. | COMMENT NO. | GPS VALUE |
| X1 | | |
| X2 | | |
| X3 | | |
| X4 | | |
| X5 | | |

FIG. 5

| 3501 | 3502 | 3503 | 3504 | 3505 | 3506 | 3507 | 3508 | 3509 | 3510 | 3511 | 3512 | 3513 |
|---|---|---|---|---|---|---|---|---|---|---|---|---|
| STORE NAME OR REG.NO. | SUNDAY | SATURDAY | WEEKDAYS | MALE | FEMALE | CLEAR | CLOUDY | RAINY | TEENAGER | TWENTIES | THIRTIES | FORTIES |
| UNIMAL OR 2001 | SU | SA | WE | MA | FE | FI | WI | RA | TE | TW | TH | FO |

FIG. 35

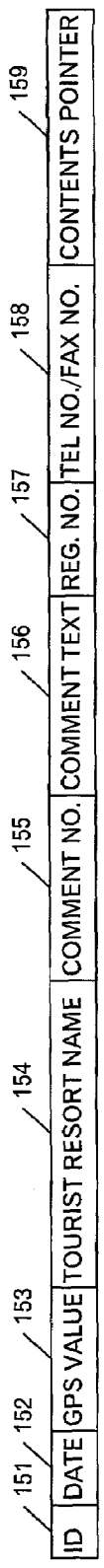
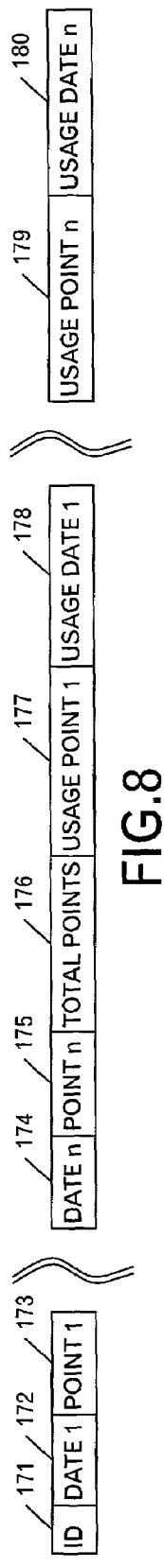
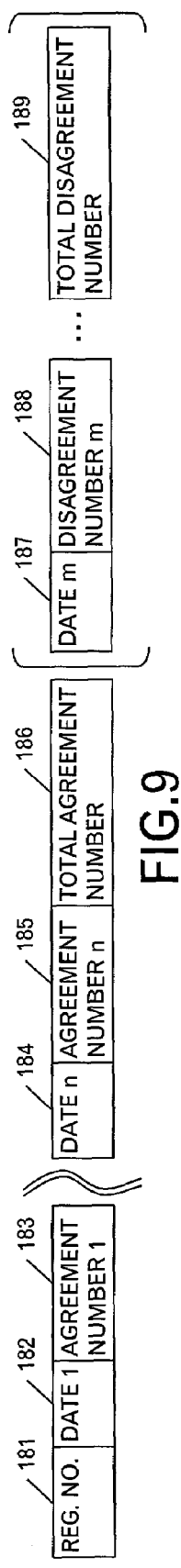
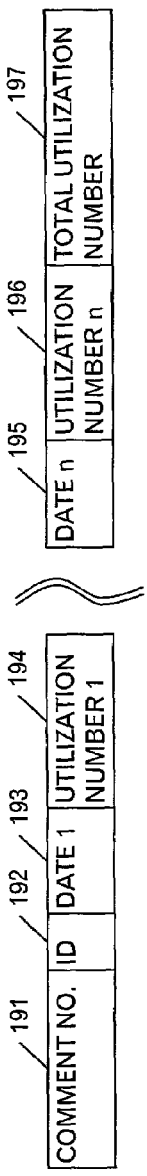
FIG.7
FIG.8
FIG.9
FIG.10

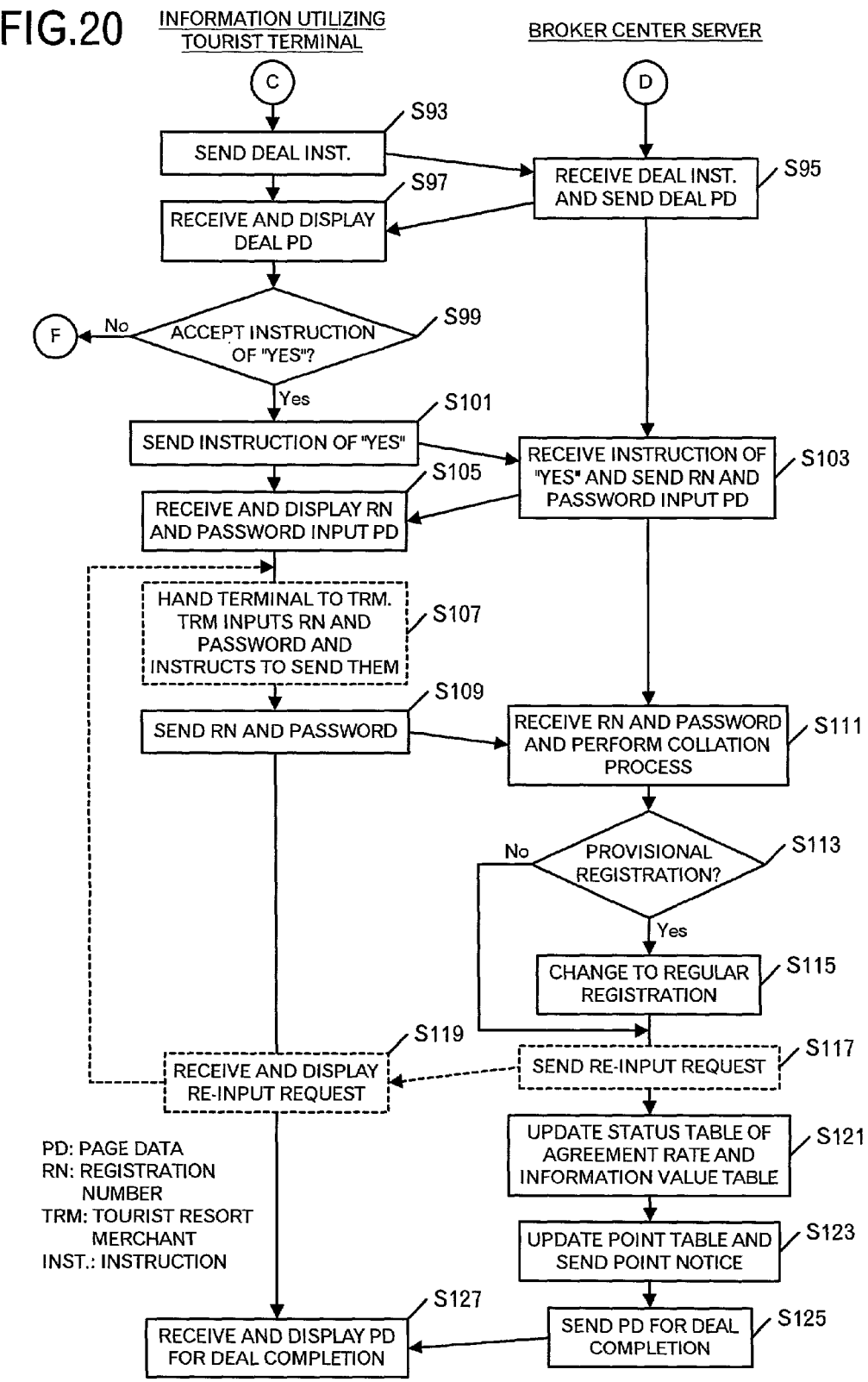

INFORMATION PROCESSING METHOD AND SYSTEM AS TO EVALUATION INFORMATION

TECHNICAL FIELD OF THE INVENTION

This invention relates to an information processing method as to evaluation information for evaluation objects, more particularly to an information processing method to collect and provide evaluation information with higher quality.

BACKGROUND OF THE INVENTION

For example, on tourist sites in the Internet, locations, names, characteristics, recommendation information, and the like of tourist resorts are provided. Persons who are planning to go sightseeing may make plans for sightseeing, referring to such information. In addition, they often use guidebooks provided by the paper medium or brochures of travel companies. Furthermore, they may refer to television programs for travels. However, in such information providing, only recommendation information is provided according to views or evaluation of informant sides.

In addition, since such information providing is performed by various mediums and in various forms, and the information is dispensed and free-formed, persons who are planning to go sightseeing were not able to collect information for tourist resorts, which really suits their own taste with high accuracy or tourist information with high quality. In addition, even as to information provided on the Internet, the latest fresh information is not always provided and it is not in a condition that fresh and timely information can be found immediately. Furthermore, although some sites show stars whose number represents the degree of evaluation by tourists, since these sites do not adopt evaluation from third persons, or, even if votes by third persons are taken into consideration, since the votes by third persons have arbitrariness, persons who are planning to go sightseeing cannot judge whether or not the evaluation is information which suits their tastes or which is reliable one if they find it.

Like mentioned above, some conventional techniques provide various evaluation information and the like for a certain subjects, such as tourist resorts, resort facilities, and tourist resort stores related to travels, but a technique, which enables to efficiently collect the evaluation information and the like, with great reliability and practical use, or to provide persons who need such information, is not disclosed.

SUMMARY OF THE INVENTION

Consequently, an object of this invention is to provide a technique to efficiently collect effectiveness information as to evaluation information for a certain evaluation object, with reliability.

In addition, another object of this invention is to provide a technique to efficiently collect highly reliable evaluation information.

Furthermore, another object of this invention is to provide a technique to promote to collect more evaluation information and its effectiveness information, by attempting to expand the utilization of the evaluation information and its effectiveness information.

Furthermore, another object of this invention is to provide a mechanism that efforts for good evaluation by an evaluation object lead to accumulation of more evaluation information and its effectiveness information.

In at least one embodiment of the present invention, a computer-implemented method executed by a server, for handling evaluation information, is provided. The method includes identifying a user ID of a member who uses a user terminal to access said server; receiving from said user terminal of said member, an ID of evaluation information for a specific business entity; identifying an ID of said specific business entity based on data received from said user terminal of said member; receiving from said user terminal of said member, a password of said business entity, which is acquired from a person who belongs to said specific business entity after a face to face deal was concluded between said member and said specific business entity without connection between said server and any terminals of said specific business entity; comparing the received password with a password, which is preregistered in a database and corresponds to said ID of said specific business entity, without suing said user ID; and upon success of the comparison, updating a number of effective utilization times for said evaluation information.

An information processing method as to evaluation information, which is the first aspect of this invention, includes the steps of: if information which specifies evaluation information for a specific evaluation object and collation information acquired from a person who is associated with the specific evaluation object were received from a user terminal, performing a collation processing by using the received collation information and a second collation information set in association with the specific evaluation object and stored in a storage device in advance; and, if the collation processing succeeded, updating the number of effective utilization times as to the evaluation information. There is a case where the information which specifies the evaluation information for the specific evaluation object and the collation information acquired from the person who is associated with the specific evaluation object are received separately as well as simultaneously.

Thus, unless true collation information (e.g. a password and a keyword), which is acquired from the person (e.g. a store salesperson) other than that of an evaluator and associated with the specific evaluation object (e.g. a tourist resort store), is sent from a terminal of user who is not either the evaluator or the specific evaluation object, the number of effective evaluation times (e.g. the utilization number in a preferred embodiment), which is the effectiveness information as to the evaluation information, does not increase. Since such a mechanism is adopted, the reliability of the number of effective utilization times becomes higher. In addition, if the collation information is sent from the user terminal only in a case that the deal is concluded, the number of effective utilization times may become an index of the practicality as well.

Incidentally, wording of "evaluation" should be understood more widely in this application, so it includes not mere "evaluation" but also just information providing.

In addition, the collation information, which is acquired from the person who is associated with the specific evaluation object, may be a password inputted to the user terminal by the person who is associated with the specific evaluation object. Thus, if, for example, the store salesperson inputs the password directly, the password is rarely leaked, and, the reliability of the number of effective utilization times becomes higher.

Furthermore, the collation information, which is acquired from the person who is associated with the specific evaluation object, may be a keyword acquired from the person who is associated with the specific evaluation object and inputted to the user terminal by the user. Using such keywords with switching heightens the reliability of the number of effective utilization times.

In addition, the first aspect of this invention may further comprise a step of, if the collation progressing succeeded, performing a processing to give a predetermined point to at least one of a person who registered the evaluation information and the user. Performing this processing enables the promotion of registering evaluation information with higher quality and to send collation information, which causes to the number of effective utilization times. In addition, if the collation information is sent from the user terminal only in a case that a deal is concluded, it may become an incentive of the deal as well.

Furthermore, the first aspect of this invention may further comprise a step of, at search of an evaluation object or evaluation information, sending the number of effective utilization times as to the evaluation information to a terminal of a searcher. With this configuration, the searcher can specify evaluation objects with small or big number of effective utilization times, and also the evaluation information with small or big number of effective utilization times. Namely, the degree of the reliability or the practicality of evaluation information can be judged easily, and an evaluation object can be selected easily.

In addition, according to such a configuration, evaluation information with good evaluation is accumulated in accordance with sales efforts and the like by the evaluation object. Furthermore, it leads to utilization of the evaluation information and/or deals by other users who looked at it. Accordingly, the number of effective utilization times rises further, and consequently, profits improve as an ability of the evaluation object to collect customers improves. Furthermore, with such a configuration, necessary hardware in the evaluation object can be minimized, and necessary works in the evaluation object can be suppressed to inputting a password, for example.

In addition, the first aspect of this invention may further comprise the steps of: if evaluation information for a certain evaluation object was received from an evaluator terminal, judging whether or not the certain evaluation object is registered; if the certain evaluation object is unregistered, provisionally registering the certain evaluation object; and if the certain evaluation object is unregistered, sending provisional registration notification including provisional collation information to a person who is associated with the evaluation object. The evaluation object does not always register voluntarily, and the evaluator may register the evaluation information independently. In that case, by registering provisionally and notifying the provisional registration to the evaluation object, the evaluation object itself can decide whether or not it uses this system. In addition, sending the provisional collation information enables it to cope with the user smoothly.

Furthermore, the first aspect of this invention may further comprise the steps of: if the aforementioned collation processing succeeded, judging whether or not the specific evaluation object is registered provisionally; and if the specific evaluation object is registered provisionally, updating the provisional registration of the specific evaluation object to the regular registration. Even if it is a provisional registration, the evaluation information is opened to the public, and therefore, persons may look at the evaluation information and use the evaluation object. In such an instance, if the provisional collation information is sent from the user terminal, the provisional registration changes to the regular registration, and it is omitted to confirm the intention of the evaluation object as to the regular registration of the evaluation object.

The second information processing method of the invention comprise the steps of: if information which specifies evaluation information for a specific evaluation object and a deal instruction were sent to a server, receiving from the server, a request for inputting collation information which is to be inputted by a person who is associated with the specific evaluation object; accepting and sending to the server, an input of the collation information from the person who is associated with the specific evaluation object; and receiving from the server, information associated with a result of the collation processing in which the sent collation information and the second collation information registered in advance in association with the specific evaluation object are used. There is a case where the information which specifies the evaluation information for the specific evaluation object and the deal instruction are sent separately as well as simultaneously.

In addition, the third information processing method of this invention comprises the steps of: if information which specifies evaluation information for a specific evaluation object and a deal instruction were sent to a server, receiving from the server, a request for inputting collation information acquired from a person who is associated with the specific evaluation object; accepting and sending to the server, an input of the collation information acquired from the person who is associated with the specific evaluation object; and receiving from the server, information associated with a result of the collation processing in which the sent collation information and a second collation information registered in advance in association with the specific evaluation object are used. There is a case where the information which specifies the evaluation information for the specific evaluation object and the deal instruction are sent separately as well as simultaneously.

Incidentally, the aforementioned method can be performed by a program and a computer, and this program is stored in a storage medium or a storage device such as a flexible disk, a CD-ROM, a magneto-optical disk, a semiconductor memory, a hard disk. And, it may be distributed through a network and so on. Incidentally, an intermediate processing result is stored in a memory temporarily.

BRIEF DESCRIPTION OF THE DRAWINGS

FIG. 3 is a diagram showing an example of a tourist table;

FIG. 4 is a diagram showing an example of a table of a tourist resort merchant;

FIG. 5 is a diagram showing an example of a bookmark table;

FIG. 6 is a diagram showing an example of a table of GPS and tourist resort candidate names;

FIG. 7 is a diagram showing an example of a comment table;

FIG. 8 is a diagram showing an example of a point table;

FIG. 9 is a diagram showing an example of a status table of agreement rate;

FIG. 10 is a diagram showing an example of an information value table;

FIGS. 18A and 18B are a diagram showing a processing flow for acquiring detail information of a comment and so on;

FIG. 19 is a diagram showing an example of a screen for displaying a map of an objective store and so on;

FIG. 20 is a diagram showing a processing flow of a deal;

FIG. 35 is a diagram showing an example of a keyword table; and

DETAIL DESCRIPTION OF THE PREFERRED EMBODIMENTS

Figure 1:
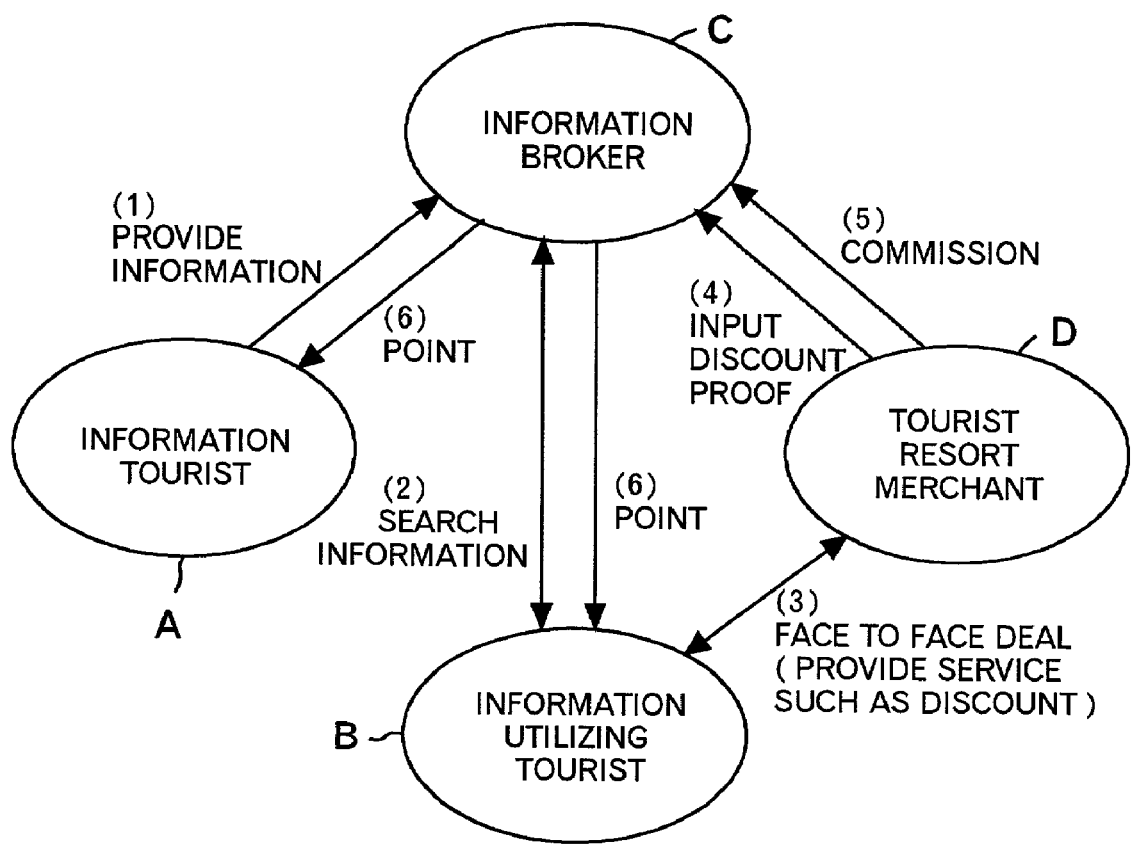
FIG. 1 is a diagram showing a business flow for one preferred embodiment of this invention.

FIG. 1 shows a business model in one embodiment of the present invention. Incidentally, in this embodiment, a description is given of an example applied to evaluation information of tourist resorts (including a tourist facility, a hotel or an inn, a store of a tourist resort merchant such as a souvenir shop, etc.), but this invention can be applied to other evaluation information as well.

Here, there appear an informant tourist A who registers evaluation information for a tourist resort, an information utilizing tourist B who utilizes the evaluation information registered by the informant tourist A to conduct a deal, an information broker C for performing management and operation of a broker center server and for carrying out registration and provision of the evaluation information through the broker center server, and a tourist resort merchant D for performing management and operation of a tourist facility or the like and for attracting tourists by using the information broker C.

First, the informant tourist A registers the evaluation information of the tourist resort, for example, recommendation information or discount information into the broker center server of the information broker C on the basis of his or her sightseeing experience (step (1)). At this time, not only text information, but also image information (still or moving image) or sound information maybe registered. The broker center server of the information broker C opens the registered information to the public through a computer network, for example, the Internet. The information utilizing tourist B accesses the broker center server of the information broker C in order to make, for example, a travel plan, and performs search (step (2)). The information utilizing tourist B sees the evaluation information registered by the informant tourist A and goes to the tourist resort as the evaluation object (for example, the store of the tourist resort merchant D).

In the store of the tourist resort merchant D, the information utilizing tourist B exhibits a display screen of the evaluation information, which was registered by the informant tourist A, on a display device of his or her cellular phone, portable terminal or the like to the tourist resort merchant D or its employee, and conducts negotiations of a face to face deal. Here, the "face to face deal" includes, for example, purchase of a souvenir, staying in an accommodation such as a hotel or an inn, and entrance into a tourist facility. Incidentally, there is also a case where even if the display screen of the evaluation information is not exhibited, the explanation that this visit is made through the information broker C or its service is sufficient. For example, in a case where discount information of a souvenir or the like is included in the evaluation information, the negotiation of the discount or the like is conducted. In case the tourist resort merchant D or the employee accepts the discount or the like and the negotiation is concluded, the face to face deal is concluded (step (3)).

Then, an input screen of collation information (here, a password of the tourist resort merchant D) is displayed on the display device such as the cellular phone of the information utilizing tourist B, and the information utilizing tourist B urges the tourist resort merchant D or the employee to input the collation information. In response to this, the tourist resort merchant D or the employee inputs the collation information to the cellular phone or the like of the information utilizing tourist B, and sends it to the broker center server of the information broker C (step (4)). This is a proof that the face to face deal is concluded, and in addition, this is convincing proof that the face to face deal is concluded on the basis of the evaluation information of the informant tourist A. That is, this is a proof that the evaluation information of the informant tourist A is reliable and is effectively utilized. Besides, the effectiveness of the evaluation information of the informant tourist A is supported by the collation information, which can be known only by the tourist resort merchant D as the evaluation object, sent from an apparatus of the information utilizing tourist B different from the informant tourist A, and therefore, it can be said that the reliability is higher than that of the conventional art.

When the face to face deal is concluded, the tourist resort merchant D pays a commission to the information broker C (step (5)). The information broker C makes a profit by the commission obtained from the tourist resort merchant D, and gives a point to the informant tourist A who registered the evaluation information which was proved to be effective and the information utilizing tourist B who actually conducted the deal to prove the effectiveness of the evaluation information (step (6)).

The point can be used as a purchase of a commodity or service, or a discount of a commodity or service, in addition to cash or a gift certificate. Giving the point becomes an incentive for the informant tourist A to register more useful evaluation information into the broker center server of the information broker C, and becomes an incentive for the information utilizing tourist B to further conduct a deal. The informant tourist A can also become the information utilizing tourist B, and the information utilizing tourist B can also become the informant tourist A.

Figure 2:
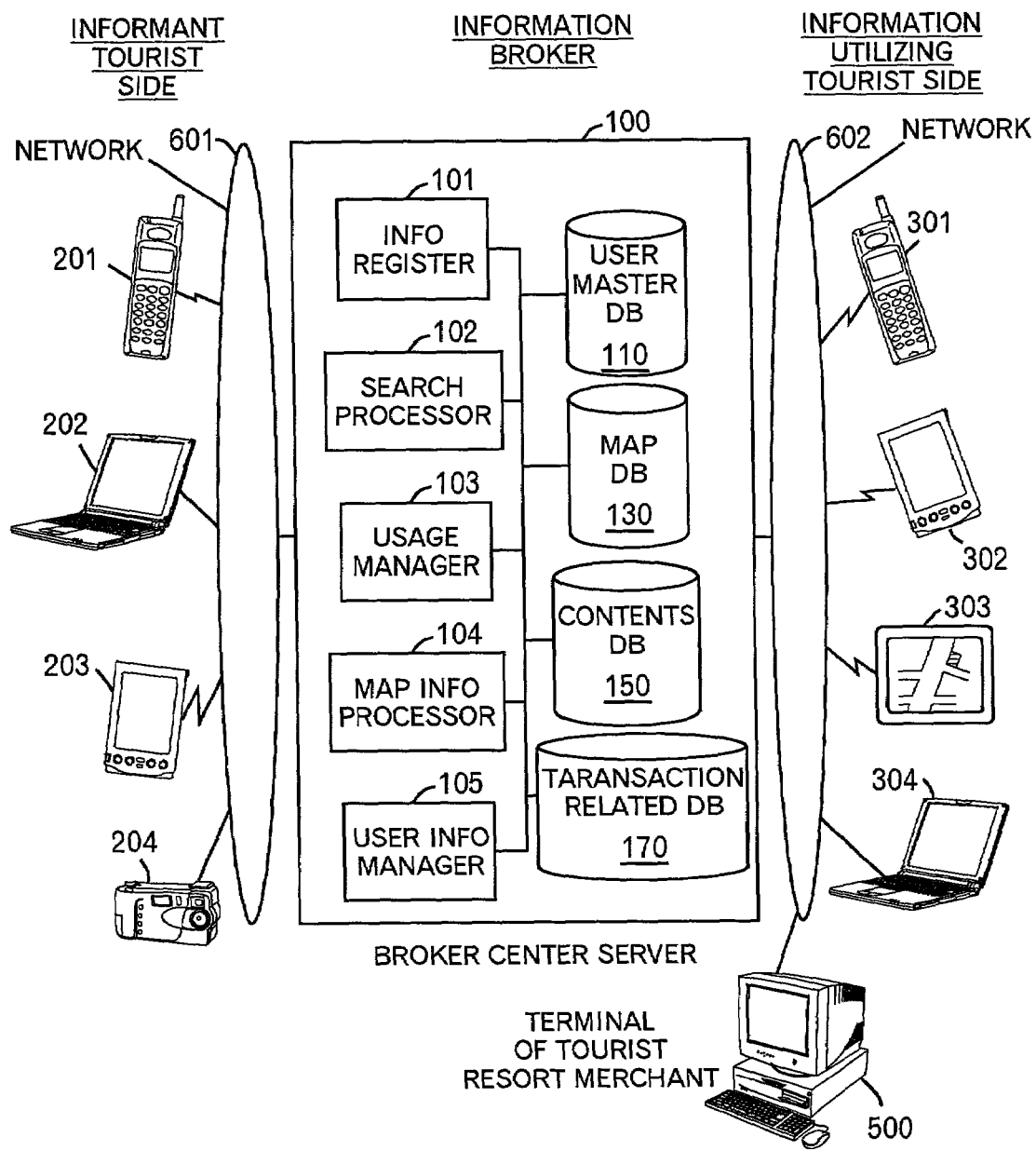
FIG. 2 is a diagram showing an example of a system configuration in one preferred embodiment of this invention.
Figure 11:
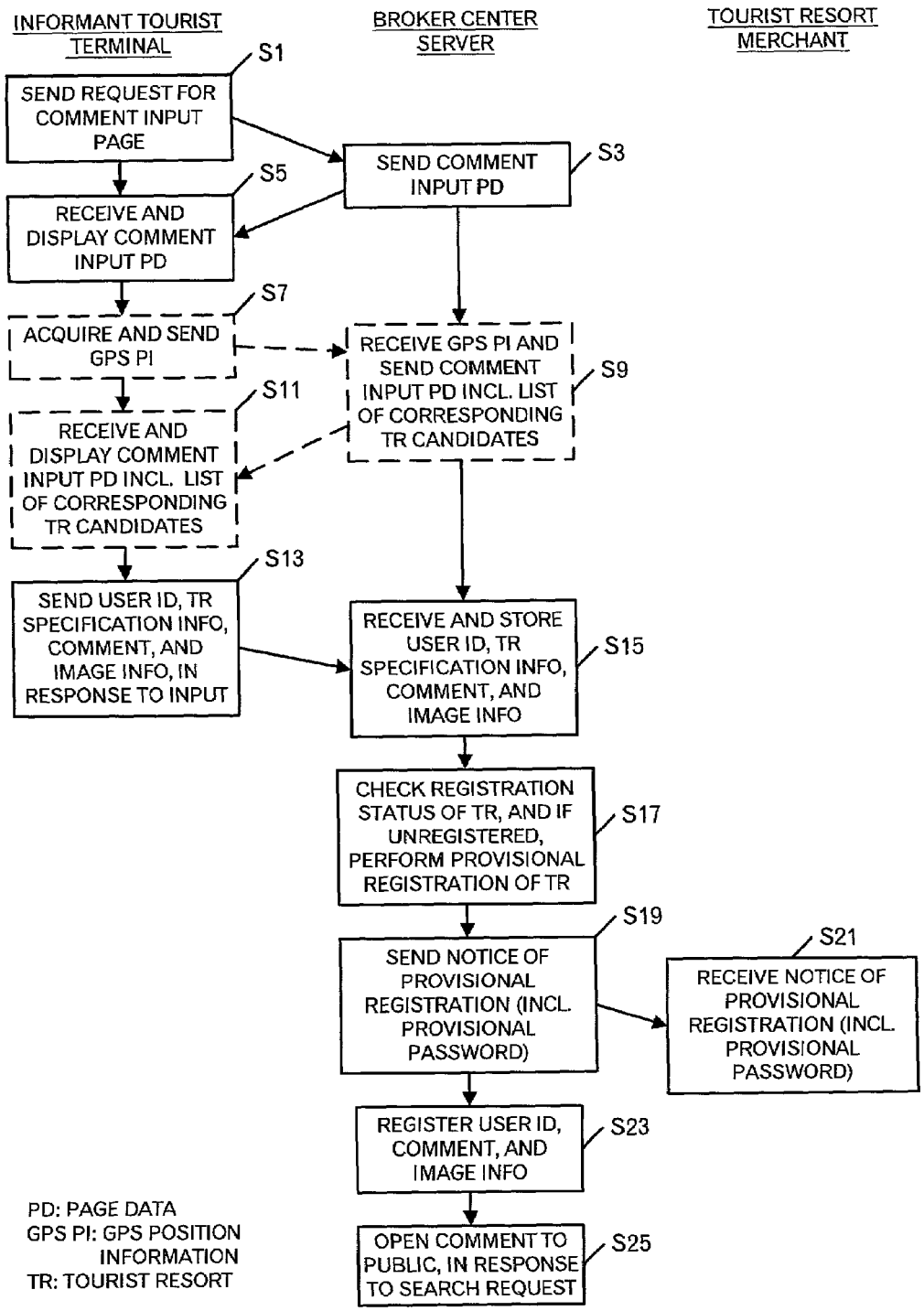
FIG. 11 is a diagram showing a processing flow for registration of evaluation information.

Next, an example of a computer system for realizing the business model shown in FIG. 1 will be described with reference to FIG. 2. The informant tourist A uses a cellular phone 201, a personal computer (PC) 202, a portable terminal (PDA: Personal Digital Assistance) 203, a digital camera 204 including a digital video camera, or the like to connect with a network 601 which is, for example, the Internet. That is, the network connection function is provided in the cellular phone 201, the PC 202, the portable terminal 203, or the digital camera 204. Besides, at least one of a Web browser function and a function for receiving and sending a mail is also provided in order to send the evaluation information or auxiliary information to a broker center server 100 of the information broker C. There is a case where the cellular phone 201, the PC 202, or the PDA 203 has the function of the digital camera 204, or there is also a case where the digital camera 204 is connected to the respective apparatuses. Besides, there is a case where the respective apparatuses have a GPS (Global Positioning System) function as well.

The broker center server 100 of the information broker C is connected to the network 601 and a network 602. Incidentally, the network 602 is substantially the same as the network 601. A cellular phone 301, a portable terminal 302, a car navigation system 303, or a PC 304 of the information utilizing tourist B is connected to the network 602. That is, the cellular phone 301, the portable terminal 302, the car navigation system 303, or the PC 304 has the network connection function. Besides, it has the Web browser function to receive and display the evaluation information or the like from the broker center server 100 of the information broker C. Incidentally, there is also a case where the tourist resort merchant D must access the broker center server 100 of the information broker C to obtain information, a terminal 500 of the tourist resort merchant is also connected to the network 602. Incidentally, the terminal 500 of the tourist resort merchant D may be any apparatus as long as it has the Web browser function, for example, a personal computer or a cellular phone, and a specific apparatus is not required. That is, it is not necessary for the tourist resort merchant D to provide a specific apparatus. Accordingly, the burden of the tourist resort merchant D is low. The information utilizing tourist B uses the cellular phone 301, the portable terminal 302, the car navigation system 303, or the PC 304 to search the evaluation information and evaluation object (tourist resort), makes a sightseeing plan, and visits the tourist resorts. At the time of the visit, there is also a case where the tourist downloads the position information of the tourist resorts from the broker center server 100 to the car navigation system 303, and visits by car in accordance with the instructions of the car navigation system 303 on the basis of the position information. Besides, in the case where the cellular phone 301, the portable terminal 302, or the PC 304 is used, there is also a case where the tourist downloads map information in which the positions of the tourist resorts are indicated from the broker center server 100, displays it on the apparatus, and visits on foot while seeing it.

The broker center server 100 of the information broker C includes an information register 101 for receiving the evaluation information concerning a specific evaluation object sent from the terminal of the informant tourist A and for carrying out a process of registration, a search processor 102 for carrying out a search process concerning the evaluation information or the evaluation object in accordance with a search request from the terminal of the information utilizing tourist B, a usage manager 103 for, in the case where that a deal was conducted on the basis of the specific evaluation information is notified, updating a utilization degree of the specific evaluation information and an agreement number and/or an agreement rate concerning the evaluation object (tourist resort) and for, in the case where the deal was not concluded, updating a disagreement number and/or a disagreement rate, a map information processor 104 for processing map information mainly used in the terminal of the information utilizing tourist B, a user information manager 105 for carrying out management of registration information of the informant tourist A, the information utilizing tourist B and the tourist resort merchant D, and management of points given to the informant tourist A and the information utilizing tourist B, a user master DB 110, a map DB 130, a contents DB, and a transaction related DB 170.

The user master DB 110 stores a tourist table concerning the informant tourist A and the information utilizing tourist B, a tourist resort merchant table concerning the tourist resort merchant D or tourist resort, and a bookmark table registered by the information utilizing tourist B. The map DB 130 stores map information and a GPS/tourist resort candidate name table. The contents DB 150 stores a comment table concerning the evaluation information registered by the informant tourist A, information (for example, image information) accompanying it, and the like. The transaction related DB 170 stores a point table concerning the points held by the informant tourist A and the information utilizing tourist B, a status table of agreement rate concerning the respective evaluation objects (tourist resorts), and an information value table concerning the respective pieces of evaluation information.

FIG. 3 shows an example of the structure of the tourist table stored in the user master DB 110. The tourist table of FIG. 3 includes a column 111 of a user ID and a password of a tourist, a column 112 of a cellular telephone number, a column 113 of a subscriber ID intrinsic to each cellular telephone, a column 114 of a name, a column 115 of an address, a column 116 of a birthday, a column 117 of gender, a column 118 of a flag indicating a marriage status, and a column 119 of a home telephone number. These pieces of information are registered when the tourist first uses the broker center server 100. Incidentally, since the subscriber ID intrinsic to the cellular telephone is registered, the broker center server 100 can grasp which cellular telephone is connected, that is, which tourist accesses. Incidentally, an address of IPv6 may be registered instead of the subscriber ID.

FIG. 4 shows an example of the structure of the tourist resort merchant table stored in the user master DB 110. The tourist resort merchant table of FIG. 4 includes a column 120 of a flag indicating a distinction between regular registration and provisional registration, a column 121 of a registration number (identification information) of the tourist resort merchant D or tourist resort, a column 122 of a password of the tourist resort merchant, a column 123 of a name of the tourist resort, a column 124 of GPS information, for storing position information of the tourist resort, a column 125 of a telephone number, a column 126 of a FAX number, a column 127 of a type (tourist facility, lodging facility, souvenir shop, etc.) of the tourist resort, a column 128 of an address, and a column 129 of an area name of the tourist resort. In principle, the tourist resort merchant D using the service through the information broker C is registered in the broker center server 100 in advance. However, the tourist resort merchant D is not necessarily registered voluntarily, and there is also a case where the informant tourist A registers the evaluation information concerning a non-registered tourist resort. In this case, when the evaluation information is registered, provisional registration is performed into the tourist resort merchant table on the basis of the information of the tourist resort (evaluation object) specified by the informant tourist A. An automatically generated registration number and a provisional password are notified to the provisionally registered tourist resort store D of the tourist resort by FAX or other means, to prompt the use of the service and the regular registration. There is also a case where such statutes are adopted that when the provisional password is used, the registration automatically becomes regulation registration, and the obligation to pay a commission to the information broker C is produced. There is also a case where even during the provisional registration, the evaluation information is opened to the information utilizing tourist B, or there is also a case where the evaluation information is not opened until the regular registration. Besides, since the tourist resort merchant D does not pay the commission to the information broker C during the provisional registration, there is also a case where even if the evaluation information is opened, no point is given. By introducing such a provisional registration system, it is possible to prompt the informant tourist A to register the evaluation information concerning an arbitrary tourist resort, and to prompt the tourist resort merchant D to enter the service and to actively use it.

FIG. 5 shows an example of the structure of the bookmark table stored in the user master DB 110. The example of FIG. 5 includes a column 141 of a indication number (No.) as a number or a symbol at the time of display on a map, a column 142 of a comment number of evaluation information to which an instruction of bookmark registration is given, and a column 143 of a GPS value (also called GPS position information) of a tourist resort as an evaluation object of evaluation information to which an instruction of bookmark registration is given. Since the comment number is stored, the information concerning the tourist resort can be obtained from the comment table described later.

FIG. 6 shows an example of the structure of the GPS/tourist resort candidate name table stored in the map information DB 130. The table of FIG. 6 includes a column 131 of a GPS value (range), and columns 132 to 135 of tourist resort candidate names included within the GPS value (range). As stated above, the tourist resort names as candidates are stored in every predetermined GPS value (range). In addition to this table, map images of predetermined scales are stored in the map information DB 130.

FIG. 7 shows an example of the structure of the comment table stored in the contents DB 150. The comment table of FIG. 7 includes a column 151 of a user ID of the informant tourist A, a column 152 of a registration date, a column 153 of a GPS value of a tourist resort as an evaluation object, a column 154 of a name of the tourist resort as the evaluation object, a column 155 of a comment number as identification information of the evaluation information, a column 156 of a text (text information) as the main body of the evaluation information, a column 157 of a registration number of the tourist resort, a column 158 of a telephone number/FAX number of the tourist resort, and a column 159 of a contents pointer as a pointer toward image data of a digital camera as auxiliary information. Incidentally, the auxiliary information of the image data or the like indicated by the contents pointer is also stored in the contents DB 150.

FIG. 8 shows an example of the structure of the point table stored in the transaction related DB 170. The point table of FIG. 8 includes a column 171 of a user ID of a tourist, a column 172 of a date (date 1) of point acquisition, a column 173 of an acquired point value (point 1) on the date 1, a column 174 of a date (date n) of point acquisition, a column 175 of an acquired point value (point n) on the date n, a column 176 of a total point value, a column 177 of a usage point value (usage point 1) in a case where the acquired point is used, a column 178 of a date (usage date 1) when the usage point 1 is used, a column 179 of a usage point value (usage point n) in a case where the acquired point is used, and a column 180 of a date (usage date n) when the usage point n is used.

FIG. 9 shows an example of the structure of the status table of the agreement rate stored in the transaction related DB 170. The status table of the agreement rate of FIG. 9 includes a column 181 of a registration number of a tourist resort merchant, a column 182 of a date (date 1) when a deal was concluded, a column 183 of an agreement number (agreement number 1) on the date 1, a column 184 of a date (date n) when a deal was concluded, a column 185 of an agreement number (agreement number n) on the date n, and a column 186 of a total agreement number. Incidentally, although described below, there is also a case where notification is given even in the case where a deal was not concluded, there is also a case where a column 187 of a date when the deal was not concluded (date m), a column 188 of a disagreement number (disagreement number m) on the date m, and a column 189 of a total disagreement number are included.

FIG. 10 shows an example of the structure of the information value table stored in the transaction related DB 170. The information value table of FIG. 10 includes a column 191 of a comment number of evaluation information, a column 192 of a user ID of the informant tourist A who registered the evaluation information, a column 193 of a date (date 1) when a deal was concluded on the basis of the evaluation information, a column 194 of the number of deals which were concluded on the date 1, that is, a utilization number (utilization number 1) of the evaluation information, a column 195 of a date (date n) when a deal was concluded on the basis of the evaluation information, a column 196 of the number of deals which were concluded on the date n, that is, a utilization number (utilization number n) of the evaluation information, and a column 197 of a total utilization number.

Next, a processing flow of the system shown in FIG. 2 will be described with reference to FIGS. 11 to 36. First, a registration process of the evaluation information by the informant tourist A will be described with reference to FIGS.

11 and 12. First, the informant tourist A operates the terminal (the cellular phone 201, the PC 202, the PDA 203, the digital camera 204, or the like, and here, the PC 202) to cause the PC 202 to send a request for comment input page to the broker center server 100 (step S1). When receiving the request for the comment input page from the PC 202 of the informant tourist A, the information register 101 of the broker center server 100 sends the comment input page data to the PC 202 in accordance with the request (step S3).

Figure 12:
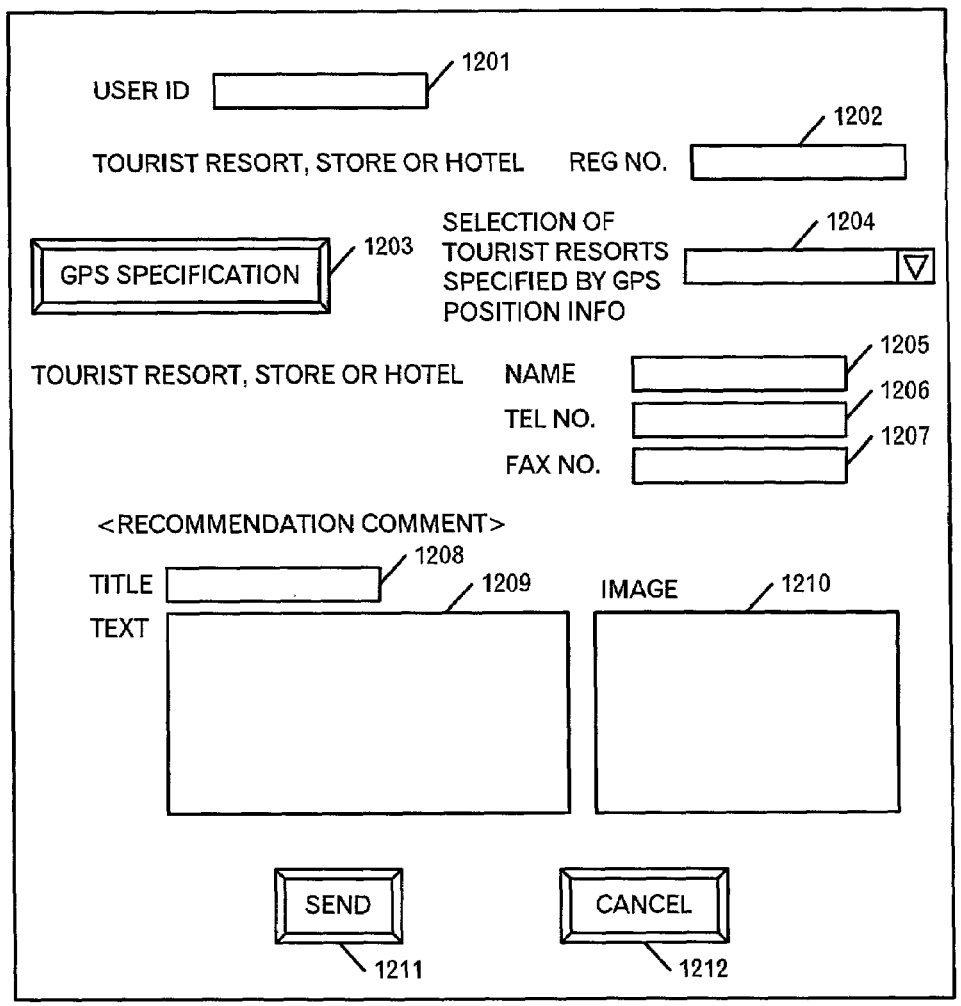
FIG. 12 is a diagram showing an example of a screen for inputting the evaluation information.

The PC 202 receives the comment input page data from the broker center server 100, and displays it on the display device with the Web browser (step S5). FIG. 12 shows an example of a display screen displayed on the PC 202 at this time. The example of FIG. 12 includes an input column 1201 of a user ID, an input column 1202 of, in a case where a tourist resort (tourist resort, tourist facility, store, hotel, etc.) is already registered, a registration number of the tourist resort, a GPS specification button 1203 for obtaining a GPS value from a GPS equipment provided in or connected to a terminal of the informant tourist A, such as the PC 202, and for sending it to the broker center server 100, a combo box 1204 containing, as options, a list of tourist resort candidate names extracted on the basis of the sent GPS value from the GPS/tourist resort candidate name table stored in the map information DB 130 of the broker center server 100, an input column 1205 of a name of a tourist resort (tourist resort, tourist facility, store, hotel, etc.) inputted in a case where the registration number of the tourist resort is unclear, an input column 1206 of a telephone number, an input column 1207 of a FAX number, an input column 1208 of a title of a recommendation comment as the evaluation information, an input column 1209 of a text of the recommendation comment as the evaluation information, an image input column 1210 in which image information of the tourist resort as the evaluation object, which was photographed with the digital camera 204 or a built-in or connected digital camera function, is specified or pasted, a send button 1211 for sending the inputted information, and a cancel button 1212 for canceling the input.

The informant tourist A sees the display screen as shown in FIG. 12, inputs the information to specify the tourist resort as the evaluation object and the recommendation comment as the evaluation information, and specifies the image of the tourist resort. Incidentally, in the case where the informant tourist A is in the tourist resort and can use a GPS equipment, the GPS specification button 1203 may be pressed. In this case, the PC 202 obtains the GPS position information from the GPS equipment, and sends it to the broker center server 100 (step S7). The information register 101 of the broker center server 100 receives the GPS position information from the PC 202, uses the GPS position information to search the GPS/tourist resort candidate name table stored in the map DB 130, and extracts the list of tourist resort candidate names corresponding to the GPS position information. Then, the information register 101 generates the comment input page data including the list of the tourist resort candidate names as the options of the combo box 1204 and sends it to the PC 202 (step S9). The PC 202 receives from the broker center server 100 the comment input page data including the list of the tourist resort candidate names corresponding to the GPS position information as the options of the combo box 1204, and displays it on the display device with the Web browser (step S11). Incidentally, since there is also a case where these steps S7 to S11 are not carried out, they are indicated by dotted lines in FIG. 11. The informant tourist A selects the evaluation object from the combo box.

Then, the informant tourist A operates the PC 202 clicks the send button 1211 of FIG. 12, and instructs to send the input information. In response to the send instruction, the PC 202 sends the user ID, the tourist resort specification information, the comment (evaluation information), and the image information to the broker center server 100 (step S13). Incidentally, there is also a case where a mail address and GPS position information are also sent. The information register 101 of the broker center server 100 receives the user ID, the tourist resort specification information, the comment (evaluation information), and the image information from the PC 202, and temporarily stores them into the storage device (step S15). Then, in order to register them into the comment table of the contents DB 150, the tourist resort specification information is used to confirm whether or not the tourist resort is registered. In the case where the register number is included in the tourist resort specification information, it is clear that the registration has already been completed. However, in the other case, the tourist resort merchant table included in the user master DB 110 is searched to judge whether the tourist resort is registered. In case the tourist resort specified by the tourist resort specification information is not included in the tourist resort merchant table, the user information manager 105 uses the tourist resort specification information to register a new record as provisional registration into the tourist resort merchant table (step S17). That is, a flag to indicate the provisional registration is set in the column 120 of the flag indicating the distinction between the regular registration and the provisional registration, and the other information obtained from the tourist resort specification information is registered. Besides, a registration number and a provisional password are also issued, and are registered in the tourist resort merchant table.

Then, the user information manager 105 sends the tourist resort merchant D notice of the provisional registration which includes the registration number and the provisional password and includes the content explanation and statutes of the service, treatment of the provisional password, guidance for regular registration, and the like (step S19). Incidentally, it is possible to establish the statutes such that when the provisional password is used, the registration automatically becomes the regulation registration, and the obligation to pay the commission to the information broker C is produced. It is also possible to adopt such an arrangement that even if the provisional password is used, a point is not given to the informant tourist A and the information utilizing tourist B until the regular registration is completed. A method of sending the notice of the provisional registration may be mail when a mail address can be obtained, may be FAX when a FAX number is obtained, and may be forwarding through the post when an address can be obtained. The tourist resort merchant D receives the notice of the provisional registration including the provisional password and the like sent by the user information manager 105 (step S21). The tourist resort merchant D reads the notification, and judges whether the regular registration should be performed to use the service.

The information register 101 of the broker center server 100 registers the received user ID, the comment (evaluation information) and the image information, the registration date, and the information concerning the tourist resort specified by the tourist resort specification information into the comment table of the contents DB 150 (step S23). When registered in the comment table, regardless of whether or not the tourist resort as the evaluation object is provisionally registered, the comment is opened to the public in response to the search request of the information utilizing tourist B (step S25).

As described above, the comment (evaluation information) is registered in the broker center server 100 by the informant tourist A, and is utilized by the information utilizing tourist B.

Next, a processing flow at the time of usage of the evaluation information will be described with reference to FIGS. 13 to 24. For example, when a travel plan is arranged, in order to search the evaluation information and tourist resorts as evaluation objects, the information utilizing tourist B operates the cellular phone 301, the portable terminal 302, the car navigation system 303, the PC 304 or the like (hereinafter, it is assumed that the PC 304 is operated) to cause the Web browser to send a request for search page to the broker center server 100 (step S31). When receiving the request for the search page from the PC 304, the search processor 102 of the broker center server 100 sends the search page data to the PC 304 (step S33). The PC 304 receives the search page data from the broker center server 100 and displays it on the display device with the Web browser (step S35).

Figure 14:
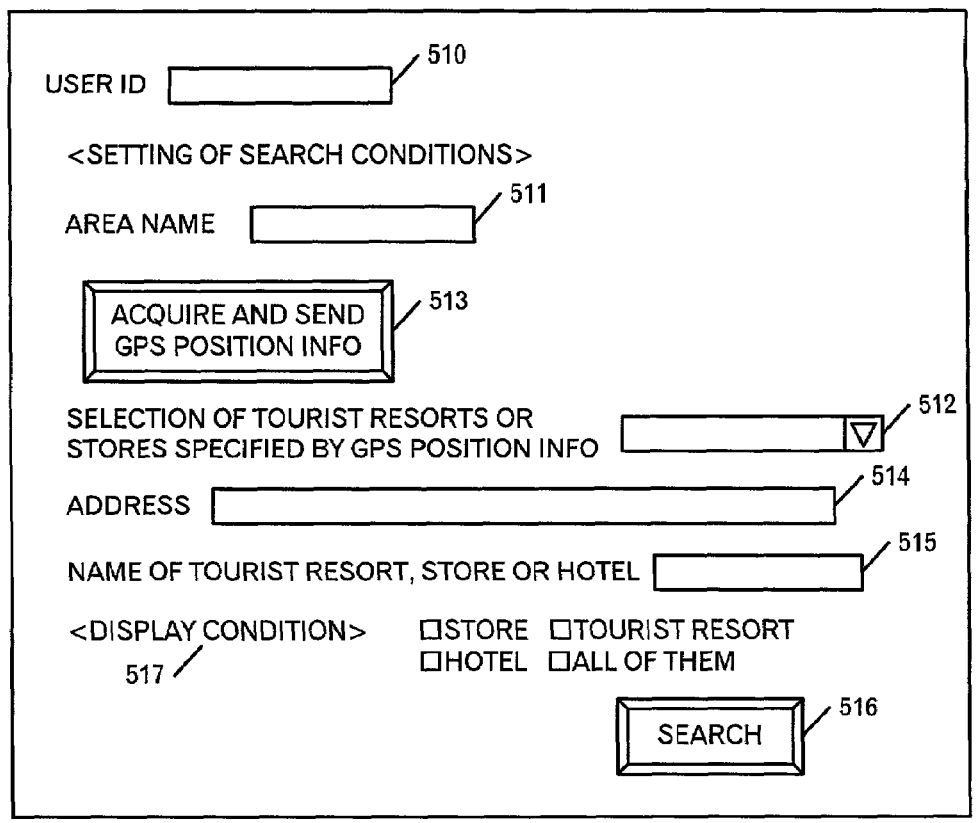
FIG. 14 is a diagram showing an example of a screen for inputting search conditions of the evaluation information or tourist resorts.

FIG. 14 shows an example of a display screen of the search page. The example of the display screen of FIG. 14 includes an input column 510 of a user ID, an input column 511 of an area name included in search conditions, a button 513 for acquiring and sending GPS position information, a combo box 512 which contains, as options, a list of tourist resort candidate names extracted on the basis of the sent GPS value from the GPS/tourist resort candidate name table stored in the map information DB 130 of the broker center server 100, an input column 514 of an address, an input column 515 of a name of a tourist resort (tourist resort, tourist facility, store, hotel, etc.), a check column 517 of display condition setting, for displaying one of store, tourist resort (tourist facility), hotel, and all of them, and a search button 516.

The information utilizing tourist B sees the display screen as shown in FIG. 14, and inputs the search conditions. Incidentally, in the case where the information utilizing tourist B is already in the vicinity of the tourist resort and the GPS equipment is incorporated in the PC 304 or is connected thereto, for example, the button 513 for acquiring and sending the GPS position information can be clicked. In the case where it is clicked, the PC 304 acquires the GPS position information from the GPS equipment, and sends the GPS position information to the broker center server 100 (step S37). When receiving the GPS position information from the PC 304, the search processor 102 of the broker center server 100 uses the GPS position information to search the GPS/tourist resort candidate name table stored in the map DB 130, and extracts the list of the tourist resort candidate names corresponding to the GPS position information. Then, the search processor 102 generates the search page data including the list of the tourist resort candidate names as the options of the combo box 514 and sends to the PC 304 (step S39). The PC 304 receives from the broker center server 100 the search page data including the list of the tourist resort candidate names corresponding to the GPS position information as the option of the combo box 514, and displays it on the display device with the Web browser (step 41). Incidentally, since there is also a case where these steps S37 to S41 are not carried out, they are indicated by dotted lines in FIG. 13. The information utilizing tourist B selects a search object from the combo box.

After inputting the search conditions, the information utilizing tourist B clicks the search button 516. Then, the Web browser of the PC 304 sends the inputted search conditions to the broker center server 100 (step S43). The broker center server 100 receives the search conditions from the PC 304, and searches the contents DB 150 on the basis of the search conditions. Then, the search processor 102 generates Web page data including the search result and the like and sends it to the PC 304 (step S45). Incidentally, when the Web page data is generated, the information stored in the status table of the agreement rate stored in the transaction related DB 170 is utilized. That is, the data of the agreement number may be extracted and may be included in the Web page data, or in the case where the search result includes a plurality of stores (tourist resorts), they may be arranged in the order of the agreement number or agreement rate. Besides, there is also a case where the information of the tourist resort merchant table included in the user master DB 110 is included in the Web page data. For example, the area name of the tourist resort, the telephone number, the distinction between provisional registration and regular registration, and the like may be included. Further, there is also a case where the information of the tourist table included in the user master DB 110 is utilized. For example, information concerning a ratio of man to woman of the informant tourists A who registered the evaluation information, or one (man or woman) who registered the evaluation information more, an average age or generation, or a generation of the informant tourists A who registered a lot of evaluation information, a ratio of a married person to an unmarried person, or one who registered the evaluation information more, may be generated and may be included in the Web page data. The PC 304 receives the Web page data including the search result from the broker center server 100, and displays it with the Web browser (step S47).

Figure 15:
FIG. 15 is a diagram showing an example of a display screen of a search result.

FIG. 15 shows an example of a display screen of the search result. The example of the display screen of FIG. 15 shows the case in which the store is selected in the check column 517 of the display condition setting in FIG. 14. The example of the display screen of FIG. 15 includes a display column 520 of a store name (tourist resort name), a provisional registration mark 530 displayed in the case of the provisional registration, a display column 523 of an agreement number concerning the store (tourist resort), a display column 524 of an agreement number within one month, a display column 525 of an agreement number within two months, a display column 521 of an area name of the store (tourist resort), a display column 522 of a telephone number of the store (tourist resort), a display column 526 of a ratio of man to woman of the informant tourists A who registered the evaluation information concerning the store (tourist resort) or one (man or woman) who registered the evaluation information more, a display column 527 of an average age or generation of the informant tourists A who registered the evaluation information concerning the store (tourist resort), or a generation of the informant tourists who registered the evaluation information more, a display column 528 of a ratio of a married person to an unmarried person of the informant tourists A who registered the evaluation information concerning the store (tourist resort) or one (unmarried person or married person) who registered the evaluation information more, and a button 529 for reading the evaluation information (comment) concerning the store (tourist resort). According to such information, the information utilizing tourist B refers to the agreement status of the whole, the recent agreement status, the ratio of man to woman, the age, the ratio of a married person to an unmarried person, and the like, and can judge which store (tourist resort) is one that he or she looks for or is suitable. Incidentally, if an interesting store (tourist resort) is found, the information utilizing tourist B clicks the button 529. The click of the button 529 means to select a specific tourist resort (a store in the example of FIG. 15).

In response to the click, the PC 304 sends a selection instruction of a specific tourist resort to the broker center server 100 (step S49). The search processor 102 of the broker center server 100 receives the selection instruction of the specific tourist resort from the PC 304, and reads out the evaluation information (comment) concerning the specific tourist resort from the comment table of the contents DB 150. Then, the search processor 102 generates comment list page data and sends it to the PC 304 (step S51). Incidentally, when the comment list page data is generated, data of the information value table stored in the transaction related DB 170 and the tourist table of the user master DB 110 are also utilized. The PC 304 receives the comment list page data from the broker center server 100, and displays it on the display device with the Web browser (step S53).

Figure 16:
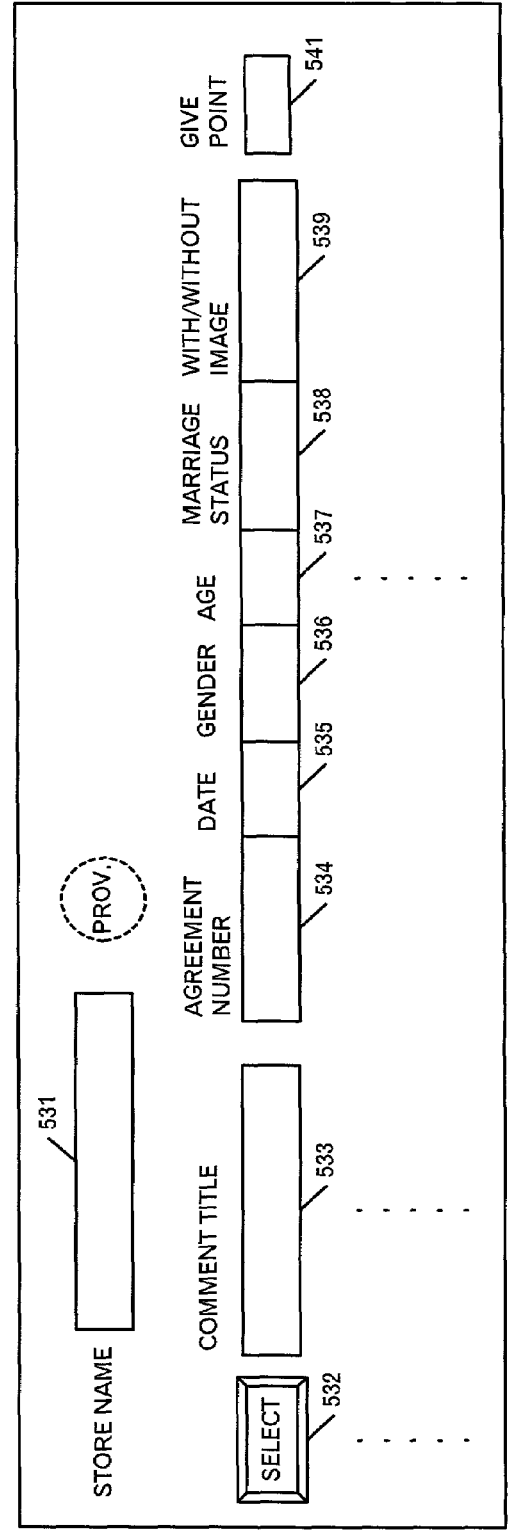
FIG. 16 is a diagram showing an example of a comment list screen.

FIG. 16 shows an example of a display screen of the comment list page data. The example of FIG. 16 includes a display column 531 of a store name (tourist resort name), a select button 532 of a specific comment (evaluation information), a display column 533 of a comment title, a display column 534 of an agreement number (utilization number) owing to the comment, a display column 535 of a comment registration date, a display column 536 of gender of the informant tourist A registering the evaluation information, a display column 537 of age of the informant tourist A registering the evaluation information, a display column 538 representing whether the informant tourist A registering the evaluation information is married or unmarried, a display column 539 indicating whether or not an image is included as auxiliary information of the evaluation information, and a check column 541 of point grant, for choosing whether a point should be given to the informant tourist A registering evaluation information other than evaluation information directly referred when a deal with a tourist resort (here, a store) as an evaluation object was concluded. Although the check column 541 may be omitted, there is also a case where a judgment is made based on not only the directly referred evaluation information, but also a combination with the other evaluation information and the deal with the specific tourist resort is determined, and it is intended that a point is given also to the informant tourist A registering the other evaluation information referred at that time.

In the case where the information utilizing tourist B determines to see the detail of a specific comment on the basis of the comment title, the utilization degree (agreement number) and the other display information, the information utilizing tourist B clicks the select button 532 at the side of the comment title of the comment. Besides, in the case where it is judged that a point should be given in relation to the comment other than the specific comment, a check is given to the check column 541, which is provided for that comment. Then, the PC 304 sends the selection instruction of the specific comment and, in the case where the check is given, the instruction to give the point for the other comment to the broker center server 100 (step S55). The search processor 102 of the broker center server 100 receives the selection instruction of the specific comment and the instruction to give the point for the other comment (in case it is included) from the PC 304. If the instruction to give the point for the other comment is included, the instruction to give the point in relation to the other comment is outputted to the user information manager 105, and the user information manager 105 temporarily stores the received information in the storage device (step S57).

Then, the search processor 102 acquires the contents of the specific comment from the comment table of the contents DB 150, generates Web page data including the contents of the specific comment, and sends it to the PC 304 (step S59). The PC 304 receives the Web page data including the contents of the specific comment from the broker center server 100, and displays it on the display device with the Web browser (step S61).

Figure 17:
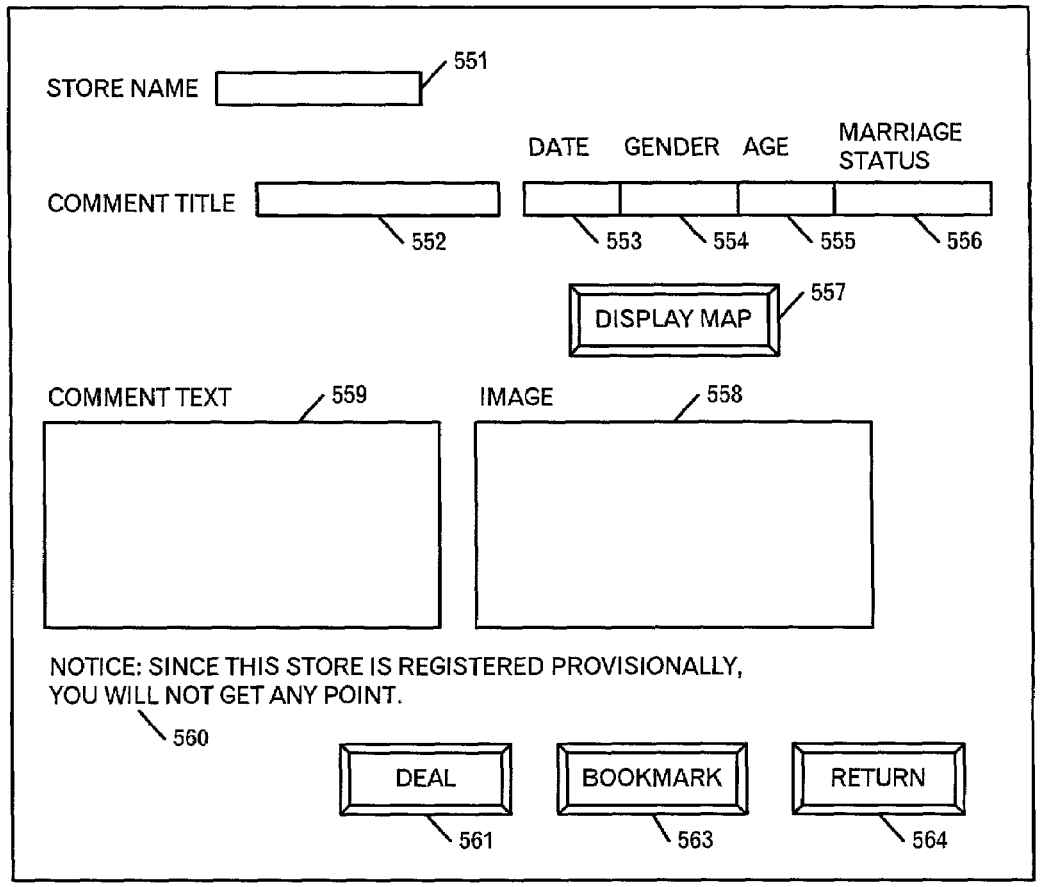
FIG. 17 is a diagram showing an example of a display screen of a comment text.

FIG. 17 shows an example of a display screen of a Web page including the contents of the specific comment. The example of FIG. 17 includes a display column 551 of a store name (tourist resort name), a display column 552 of a comment title, a display column 553 of a comment registration date, a display column 554 of a gender of the informant tourist A registering the comment (evaluation information), a display column 555 of an age of the informant tourist A registering the comment (evaluation information), a display column 556 representing whether the informant tourist A registering the comment (evaluation information) is married or unmarried, a map display button 557 for displaying a map around the store (tourist resort), a display column 559 of a comment text, a display column 558 of image information as auxiliary information of the comment, an expression 560 such as "Since this store is registered provisionally, you will not get any point" when the store (tourist resort) is registered provisionally, a deal button 561, a bookmark button 563 for registering the information of the comment in the broker center server 100 for later reference, and a return button 564 for returning to the comment list page.

Figure 13:
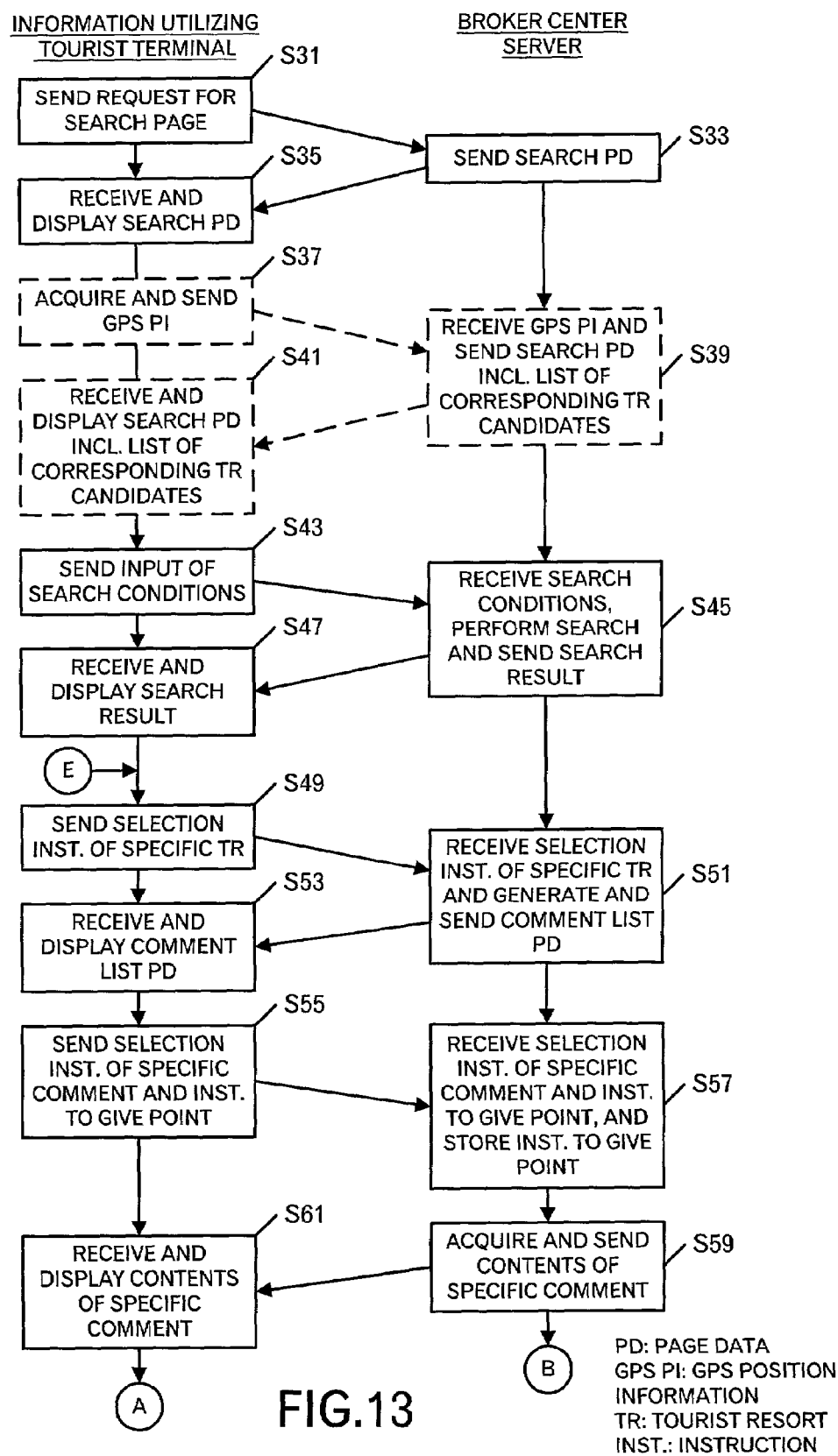
FIG. 13 is a diagram showing a processing flow for searching the evaluation information or tourist resorts.
Figure 18A:
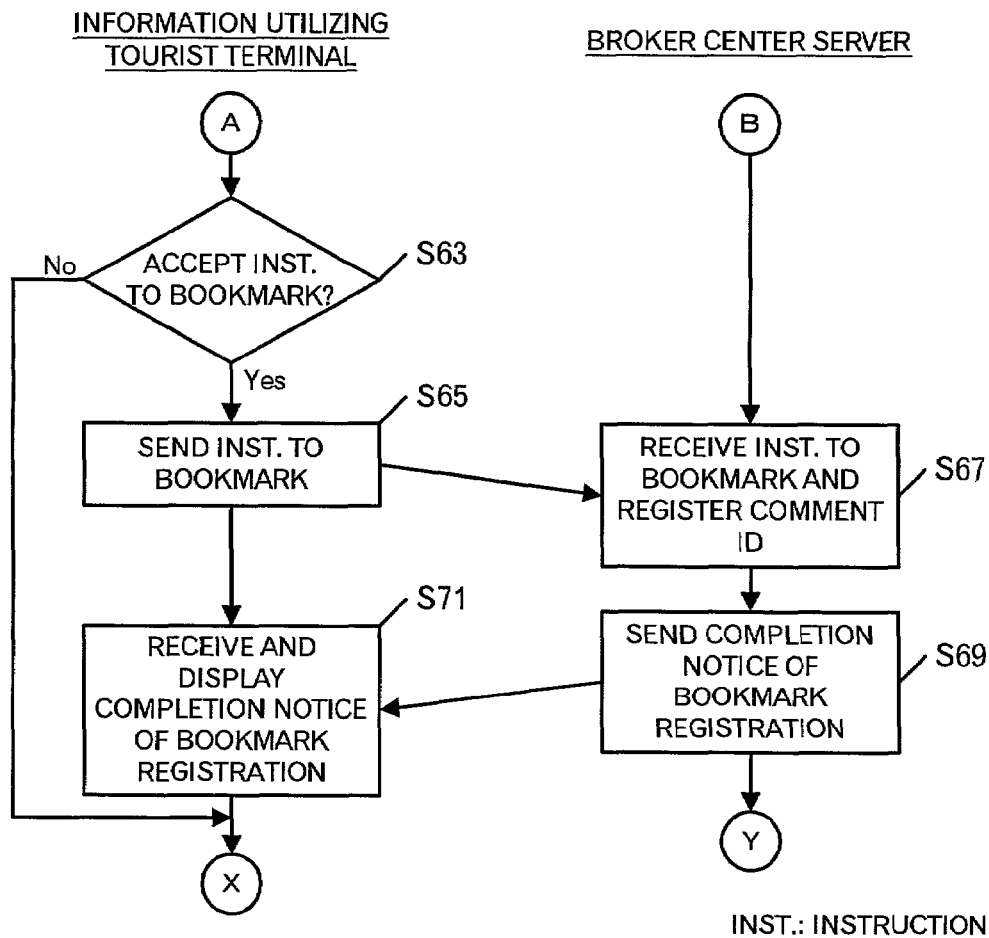
Figure 18B:
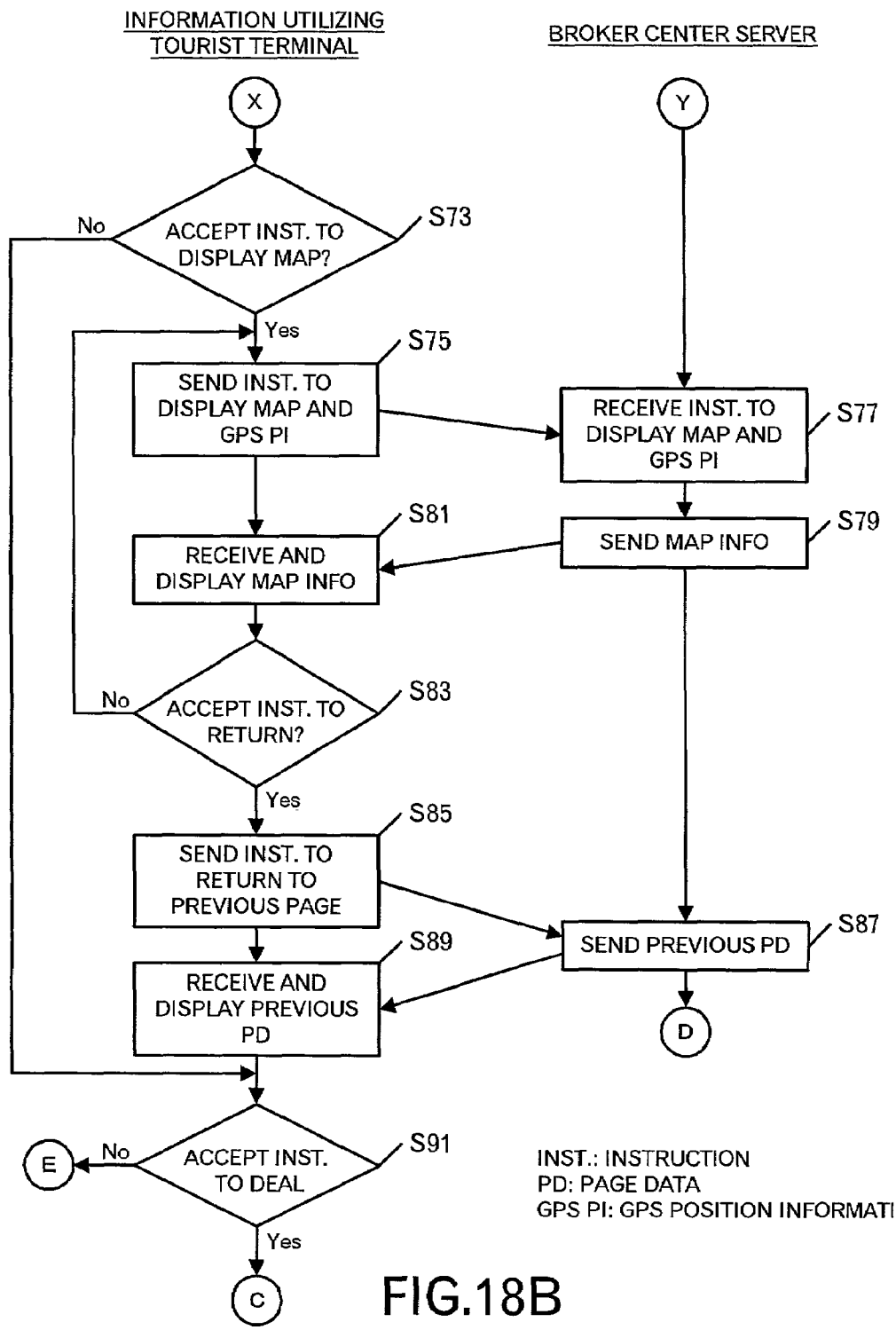

A subsequent processing proceeds to FIG. 18A and FIG. 18B through terminals A and B of FIG. 13. The information utilizing tourist B confirms the contents displayed on the PC 304, and clicks the map display button 557, the deal button 561, the bookmark button 563, or the return button 564. In case the bookmark button 563 is clicked (step S63: Yes route), an instruction to bookmark is sent to the broker center server 100 (step S65). The search processor 102 of the broker center server 100 receives the instruction to bookmark from the PC 304, and registers a comment number etc. into the bookmark table for the information utilizing tourist B in the user master DB 110 (step S67). Then, the search processor 102 sends the PC 304 completion notice of bookmark registration, which notifies the completion of the registration into the bookmark table (step S69). The PC 304 receives the completion notice of the bookmark registration from the broker center server 100, and displays it on the display device with the Web browser (step S71). Incidentally, data for the completion notice of the bookmark registration sent at the step S69 may be such that the contents of the completion notice of the bookmark registration are further included in the Web page data of FIG. 17, or may be such that the contents of the completion notice of the bookmark registration is further included in the Web page data of the comment list (FIG. 16). The processing shifts to FIG. 18B through the terminals X and Y.

In case the bookmark button 563 is not clicked (step S63: No route) or after the step S71, it is judged whether the map display button is clicked (step S73). In the case where the map display button is clicked (step S73: Yes route), when the information utilizing tourist B is in the vicinity of the tourist resort and the PC 304 can use a GPS equipment, GPS position information is acquired, and the GPS position information and an instruction to display a map are sent to the broker center server 100 (step S75). In case the GPS position information can not be acquired, or the information utilizing tourist is not in the vicinity of the tourist resort, the sending of the GPS position information may be omitted.

When receiving the instruction to display the map and the GPS position information from the PC 304 (step S77), the map information processor 104 of the broker center server 100 acquires the GPS position information of the evaluation object (store) of the evaluation information (comment) from the comment table of the contents DB 150, searches the map DB 130 on the basis of the GPS position information of the evaluation object (store) and the received GPS position information, and extracts suitable map information. That is, the map image information on such a scale that the GPS position information of the evaluation object (store) and the received GPS position information (present position of the information utilizing tourist B) are contained in one map is read out from the map DB 130. Then, the evaluation object (store) and the present position of the information utilizing tourist B are plotted on the map in such a form that they can be identified. Incidentally, in the case where the GPS position information is not sent from the PC 304, the suitable map image information is read out by only the GPS position information of the evaluation object (store). Then, the map information processor 104 generates the Web page data including the acquired map image information, and sends it to the PC 304 (step S79). When receiving the Web page data including the map image information from the broker center server 100, the PC 304 displays it on the display device with the Web browser (step S81).

Figure 19:
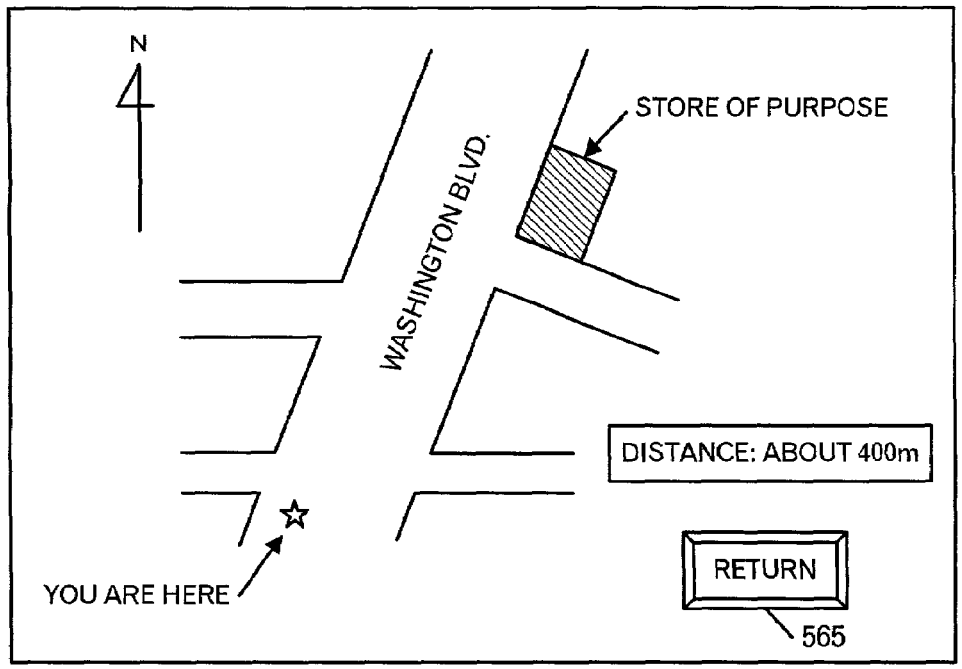

FIG. 19 shows an example of a display screen of a Web page including the map information. The example of the display screen of FIG. 19 includes a map and a return button 565. The map includes an expression concerning "store of purpose" as the evaluation object, and an expression of the present position ("you are here") of the information utilizing tourist B. Incidentally, a distance (for example, a linear distance) between these is also included. In the case where the GPS position information is not sent, the present position of the information utilizing tourist B is not displayed, and the distance is not also displayed. In this embodiment, until the information utilizing tourist B clicks the return button 565, the processing returns to, for example, periodically to step S83 (step S83: No route). In the case where the information utilizing tourist B is moving, the display of the present position of the information utilizing tourist B is also updated in FIG. 19. There is also a case where the scale is changed.

In case the return button 565 is clicked (step S83: Yes route), the PC 304 sends the instruction to return to the previous page to the broker center server 100 (step S85). When receiving the instruction to return to the previous page, the search processor 102 of the broker center server 100 sends the Web page data (for example, FIG. 17) including the contents of the specific comment to the PC 304 (step S87). The PC 304 receives the Web page data (for example, FIG. 17) including the contents of the specific comment from the broker center server 100, and displays it on the display device with the Web browser (step S89).

In case the map display button 557 is not clicked (step S73) or after the step S89, it is judged whether the deal button 561 is clicked (step S91). In case the deal button 561 is not clicked, the return button 564 turns out to have been clicked, and the processing returns to the step S49 of FIG. 13 through the terminal E. On the other hand, in the case where the deal button 561 is clicked, the processing proceeds to FIG. 20 through the terminals C and D.

Incidentally, there is also a case where the information utilizing tourist B exhibits the display of FIG. 17 to the tourist resort merchant D or the employee, and explains that this visit is based on the evaluation information registered in this system. Not the display of FIG. 17, but a display of FIG. 21 described later may be exhibited to the tourist resort merchant D or the employee. The tourist resort merchant D or the employee recognizes that the information utilizing tourist B is a user of the system and presents a discount or other benefits to the information utilizing tourist B.

In the case where the deal button 561 is clicked, the PC 304 sends a deal instruction to the broker center server 100 (step S93). When receiving the deal instruction from the PC 304, the usage manager 103 of the broker center server 100 sends deal page data (step S95). The PC 304 receives the deal page data from the broker center server 100, and displays it on the display device with the Web browser (step S97).

Figure 21:
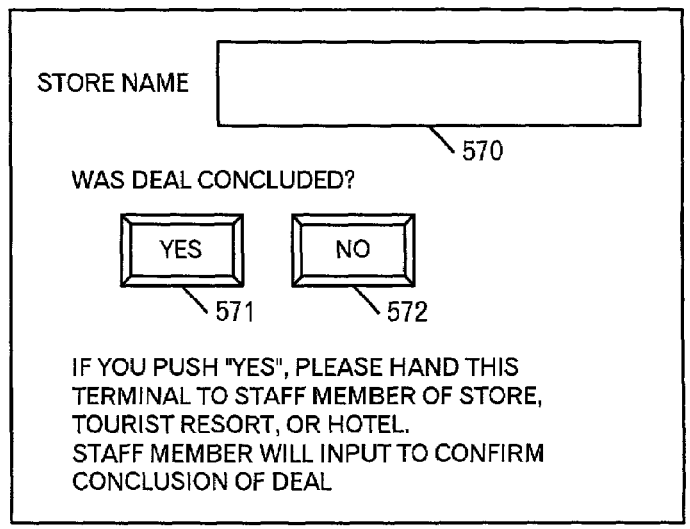
FIG. 21 is a diagram showing a example of a first screen at the deal.

FIG. 21 shows an example of a display screen of the deal page data. The example of the display screen of FIG. 21 includes a display column 570 of a store name, a YES button 571 for notifying conclusion of deal, and a NO button 572 for notifying failure of deal. Besides, it includes also an expression of "If you push "YES", please hand this terminal to staff member of store, tourist resort, or hotel. Staff member will input to confirm conclusion of deal." Incidentally, this expression may be displayed in such a way that in the case where the YES button 571 is pushed, it is separately sent from the broker center server 100 and is displayed on the PC 304.

In the case where negotiations are conducted between the information utilizing tourist B and the tourist resort merchant D or the employee, and the deal is finally concluded, the YES button 571 of FIG. 21 is clicked. In case the deal is not concluded, the NO button 572 is clicked. In the case where the NO button 572 is clicked (step S99: No route), the processing proceeds to a process of FIG. 24 through a terminal F from the step S99. In the case where the YES button 571 is clicked (step S99: Yes route), the PC 304 sends the YES instruction to the broker center server 100 (step S101). The usage manager 103 of the broker center server 100 receives the YES instruction from the PC 304, and sends input page data of a registration number and a password of the tourist resort (store) to the PC 304 (step S103). The PC 304 receives the input page data of the registration number and the password from the broker center server 100, and displays it on the display device with the Web browser (step S105).

Figure 22:
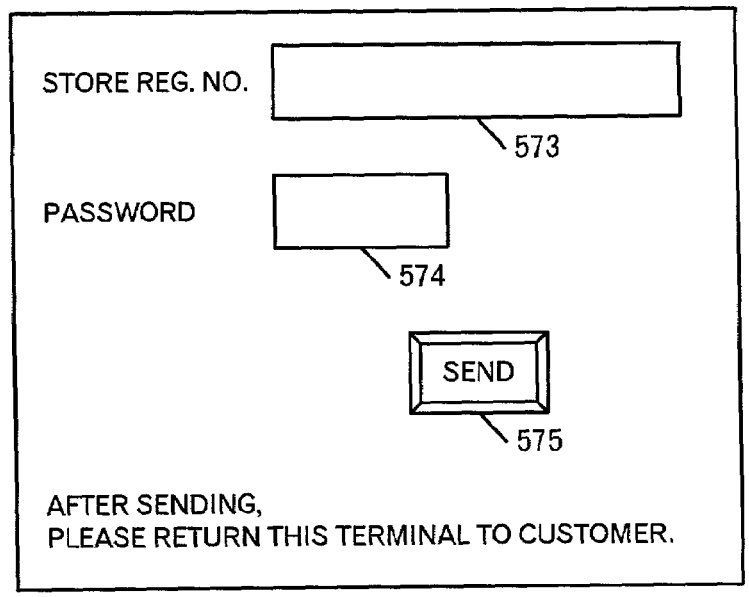
FIG. 22 is a diagram showing a example of a second screen at the deal.

FIG. 22 shows an example of a display screen of the input page data of the registration number and the password. The example of the display screen of FIG. 22 includes an input column 573 of a store (tourist resort) registration number, an input column 574 of a password, and a send button 575. Besides, it also includes an expression of "After sending, please return this terminal to customer". Incidentally, this expression may be caused in such a way that in the case where the send button 575 is pressed, it is separately sent from the broker center server 100 and is displayed on the PC 304. Besides, since the tourist resort is already specified, the registration number may have already been inputted to the input column 573 of the registration number.

The information utilizing tourist B hands the PC 304 (it may be a terminal such as the cellular phone or the like) which displays the screen as shown in FIG. 22 to the tourist resort merchant D or the employee, and the tourist resort merchant D or the employee inputs the registration number and the password, clicks the send button 575, and instructs to send them (step S107). Incidentally, in the case where the registration number is already displayed, the tourist resort merchant D or the employee confirms the registration number. Since this step is an operation of the information utilizing tourist B and the tourist resort merchant D, the block of a dotted line is used.

When the send button 575 is clicked by the tourist resort merchant D or the employee, the PC 304 sends the registration number and the password to the broker center server 100 (step S109). The usage manager 103 of the broker center server 100 receives the registration number and the password, searches the tourist resort merchant table of the user master DB 110 by the use of the registration number to read out the registered password, and carries out a collation process using the received password and the registered password (step S111).

When confirming the tourist resort merchant table of the user master DB 110, the usage manager 103 confirms whether the flag 120 indicates a provisional registration state (step S113). That is, it is confirmed whether the provisional password is sent from the terminal. In case of the provisional registration state, the flag 120 of the tourist resort merchant table is changed to the regular registration (step S115). Incidentally, the step S115 is not carried out, and step S121 and/or S123 described below may be skipped. The former is a case where such statutes are adopted that when the provisional password is used, the registration is automatically change to the regular registration, and the latter is a case where the foregoing statutes are not adopted.

Besides, in the case where the collation process is failed, a re-input request of the registration number and the password is sent to the PC 304 (step S117). The PC 304 displays the re-input request of the password etc., together with an expression of "Password is wrong" on the display device (step S119), and the processing returns to the step S107. Incidentally, for example, in the case where the collation process is failed three or more times, the process may be terminated.

In the case where the collation process is successful, the usage manager 103 updates the status table of the agreement rate and the information value table of the transaction related DB 170 (step S121). That is, in the status table of the agreement rate, correspondingly to the registration number of the tourist resort, the agreement number on the agreement date is incremented by one, the total agreement number is also incremented by one, and they are registered in the table. Besides, correspondingly to the comment number of the evaluation information specified in FIG. 17 and the comment number of the evaluation information in which the check box of the point grant in FIG. 16 is checked, the utilization number on the usage date is incremented by one, the total utilization number is also incremented by one, and they are registered in the table. Since the check box of the point grant is not checked in FIG. 16, or the check box of the point grant itself is not provided, it is optional whether the utilization number is incremented by one correspondingly to the comment number other than the comment number of the directly referred evaluation information.

Besides, the user information manager 105 updates the point table of the transaction related DB 170 (step S123). That is, in the point table of the transaction related DB 170, with respect to the records of the informant tourist A registering the evaluation information specified in FIG. 17 and the information utilizing tourist B presently conducting the deal, the point value on the point grant date is incremented by a predetermined value, the total point value is incremented by the predetermined value, and they are registered in the table. In accordance with the update of the point table, the user information manager 105 sends the notice including the information concerning the point value given this time and the total point value to the informant tourist A and the information utilizing tourist B by mail or another method. Such configuration may be adopted that the notice is not made.

The usage manager 103 sends page data for deal completion to the PC 304 (step S125). The PC 304 receives the page data for deal completion from the broker center server 100, and displays it on the display device with the Web browser (step S127).

Figure 23:
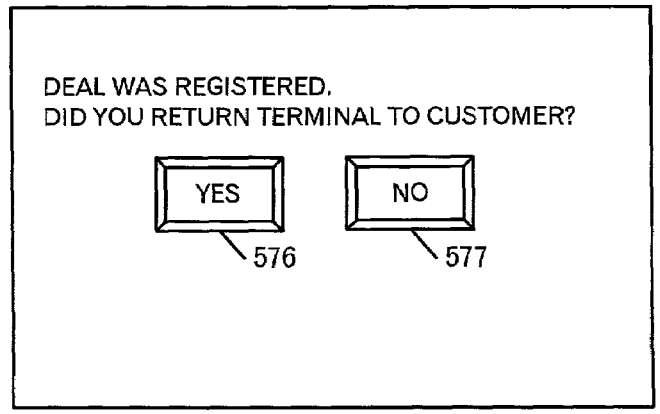
FIG. 23 is a diagram showing a example of a third screen at the deal.

FIG. 23 shows an example of a display screen of a deal completion page. In the example of the display screen of FIG. 23, there are provided an expression of "Deal was registered.", an expression of "Was your terminal returned?", an YES button 576, and a NO button 577. When one of the YES button 576 and the NO button 577 is clicked, the PC 304 sends the instruction of YES or NO to the broker center server 100. In the case of YES, the usage manager 103 of the broker center server 100 sends, for example, the Web page data of the top menu to the PC 304. In the case of NO, the usage manager 103 sends the Web page data including a message to urge return of the terminal and a similar question to the PC 304.

Figure 24:
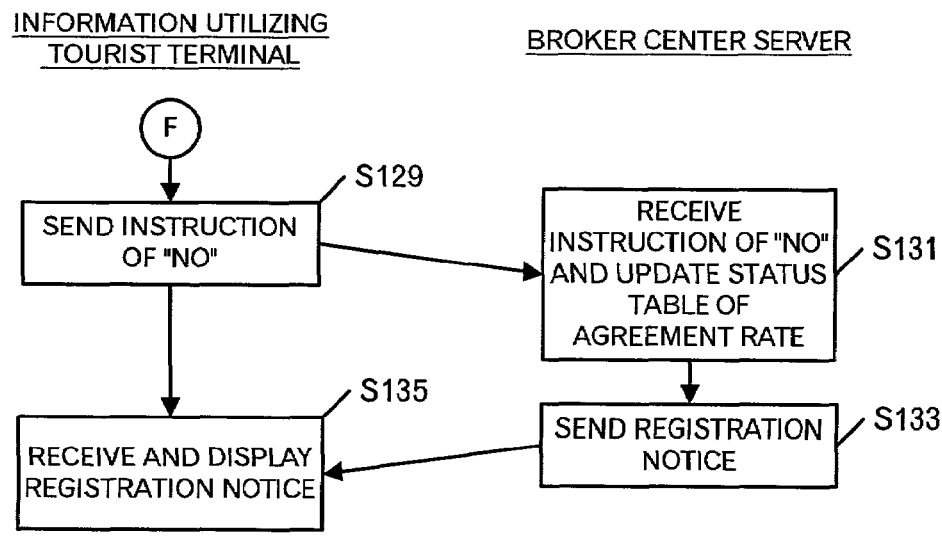
FIG. 24 is a diagram showing a processing flow in a case that the deal did not reach an agreement.

At the step S99 of FIG. 20, in the case where not the YES button 571, but the NO button 572 is clicked, the processing proceeds to a process of FIG. 24 through the terminal F, and the PC 304 sends the instruction of NO to the broker center server 100 (step S129). When receiving the instruction of NO from the PC 304, the usage manager 103 of the broker center server 100 updates the status table of the agreement rate of the transaction related DB 170 (step S131) The disagreement number on the deal failure date in the status table of the agreement rate is incremented by one, the total disagreement number is also incremented by one, and they are registered in the table. Then, the usage manager 103 sends the Web page data including the registration notice to the PC 304 (step S133). The PC 304 receives the Web page data including the registration notice from the broker center server 100, and displays it on the display device with the Web browser (step S135).

As described above, it is so contrived that the information utilizing tourist B can not increase the utilization degree of the evaluation information arbitrarily, and the reliability of the utilization degree of the evaluation information is high. Besides, since it is so contrived that the utilization degree is increased only at the time of the conclusion of the deal, that the utilization degree is high can express that the evaluation information is highly practical so that an actual deal is caused.

Next, a point information confirmation process by the informant tourist A and the information utilizing tourist B will be described with reference to FIGS. 25 to 28. First, a logon process is carried out (step S141 and step S143). The user ID and the password of the tourist are sent from the terminal (for example, the PC 202) of the tourist, and the user information manager 105 of the broker center server 100 carries out an authentication process using the data stored in the tourist table of the user master DB 110. When the authentication is failed, a message to request sending of the user ID and the password is again sent to the PC 202. When the authentication process is successful, the usage manager 103 of the broker center server 100 sends point menu page data to the PC 202 (step S145).

The PC 202 receives the point menu page data from the broker center server 100, and displays it on the display device with the Web browser (step S147). This point menu page includes a button for acquiring point information (called point information for comment utilization) given when the registered evaluation information (comment) is utilized, and a button for acquiring point information (called point information for deal) given by actually conducting the deal.

If the button for acquiring the point information for the comment utilization is clicked (step S149: Yes route), the PC 202 sends the instruction for getting the point information for the comment utilization to the broker center server 100 (step S151). The broker center server 100 receives the instruction for getting the point information for the comment utilization from the PC 202. Then, the comment table of the contents DB 150 is searched by the use of the user ID of the tourist to acquire a list of comment numbers. Further, the point table of the transaction related DB 170 is searched by the use of the comment number to acquire the total utilization degree of the respective comment numbers, and comment list page data is generated and sent to the PC 202 (step S153). Incidentally, here, it is so designed that a fixed point value is given correspondingly to one utilization degree number. The PC 202 receives the comment list page data from the broker center server 100, and displays it on the display device with the Web browser (step S155).

Figure 26:
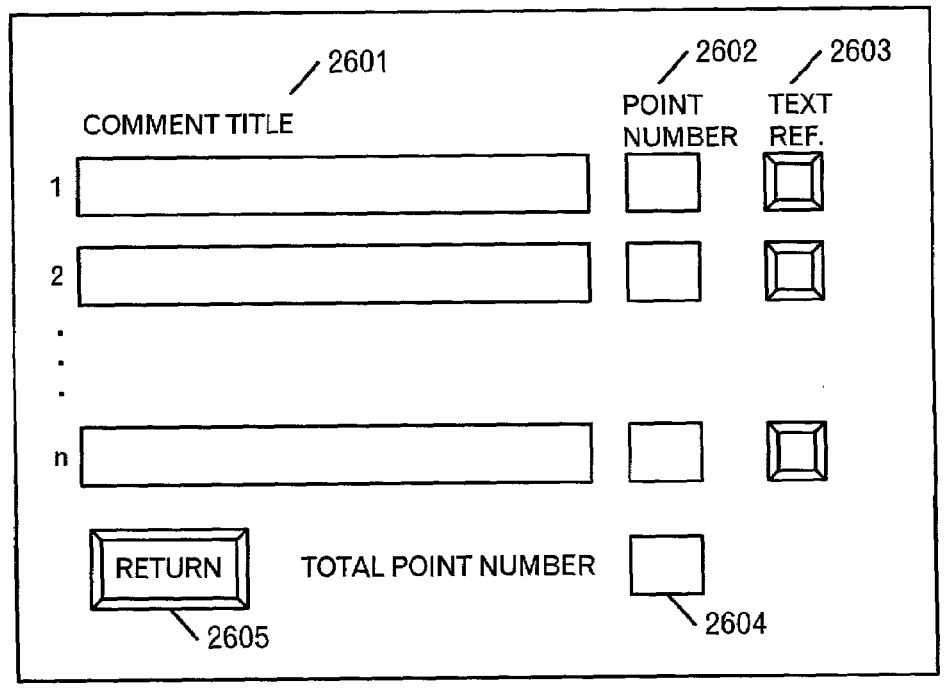
FIG. 26 is a diagram showing an example of a comment list screen for acquiring the point information for comment utilization.
Figure 25:
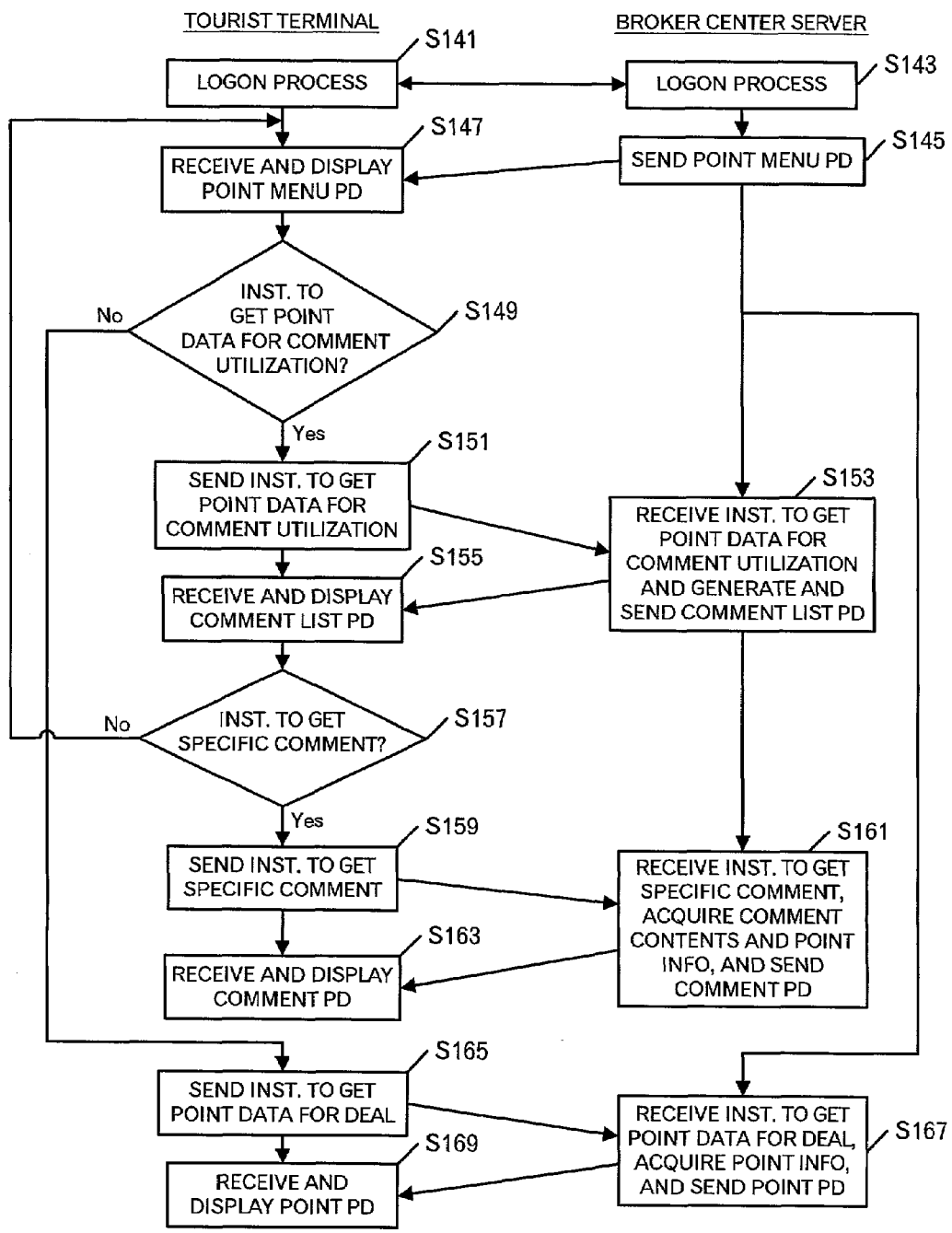
FIG. 25 is a diagram showing a processing flow for acquiring point information.

FIG. 26 shows an example of a display screen of the comment list page. The example of the display screen of FIG. 26 includes a column 2601 for comment titles, a column 2602 for point numbers, a column 2603 for text reference buttons, a display column 2604 of a total point number, and a return button 2605 for returning to the point menu page. Incidentally, the point number concerning each piece of evaluation information (comment) is calculated by a utilization number x fixed point value.

In the case where the tourist wants to refer to any evaluation information (comment), the corresponding text reference button is clicked. Then, since the specific comment is selected (step S157: Yes route), the PC 202 sends the instruction for getting the specific comment to the broker center server 100 (step S159). When receiving the instruction for getting the specific comment from the PC 202, the usage manager 105 of the broker center server 100 uses the comment number of the specific comment to search the contents DB 150 to acquire the contents of the comment, and further uses the comment number of the specific comment to search the information value table of the transaction related DB 170 to acquire the utilization number information. Then, the comment page data is generated and sent to the PC 202 (step S161). The PC 202 receives the comment page data from the broker center server 100, and displays it on the display device with the Web browser (step S163).

Figure 27:
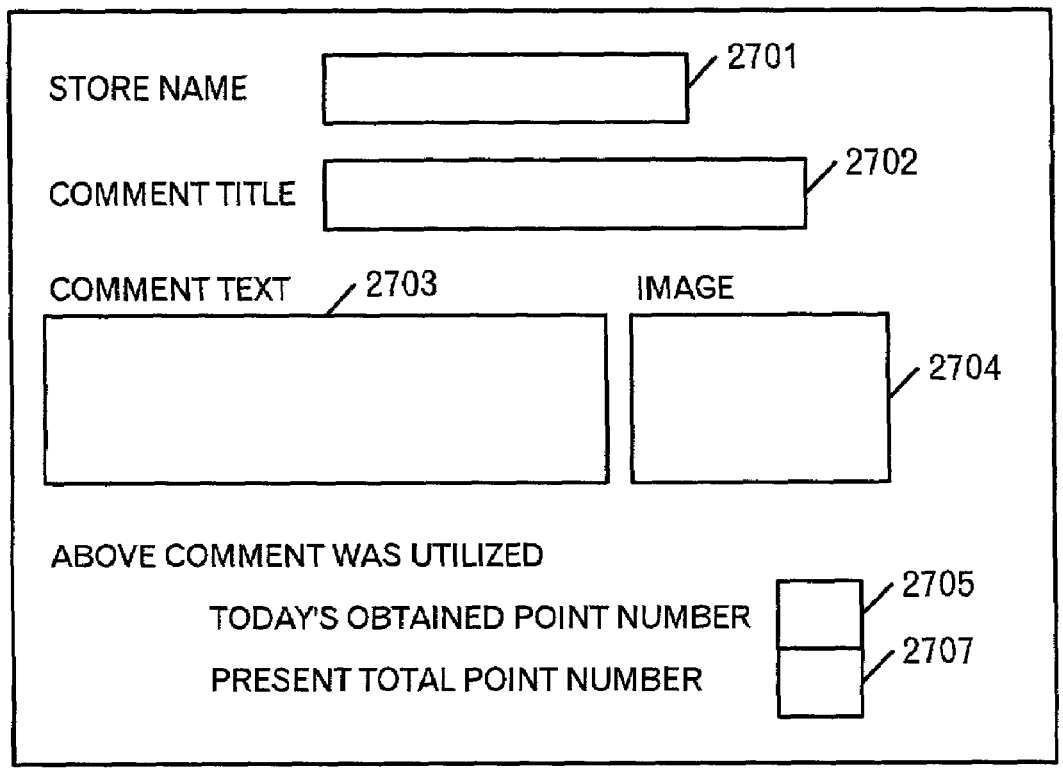
FIG. 27 is a diagram showing an example of a screen for displaying the point information for comment utilization as to a specific comment.

FIG. 27 shows an example of a display screen of the comment page. The example of the display screen of FIG. 27 includes a display column 2701 of a store name, a display column 2702 of a comment title, a display column 2703 of a comment text, a display column 2704 of an image as auxiliary information, a display column 2705 of a today's obtained point number, and a display column 2707 of a present total point number. Since the utilization degree and the total utilization degree number are recorded for every date and every comment in the information value table, the today's obtained point number and the present total point number can be easily calculated.

At the step S157, in the case where the specific comment is not selected (step S157: No route), the return button 2605 turns out to have been clicked, and the processing is returned to the step S147.

On the other hand, at the step S149, in the case where the instruction to get the point information for the comment utilization is not given, but the instruction to get the point information for the deal is given, the PC 202 sends the instruction to get the point information for the deal to the broker center server 100 (step S165). When receiving the instruction to get the point information of the deal from the PC 202, the usage manager 103 of the broker center server 100 searches the point table of the transaction related DB 170 by the use of the user ID of the tourist, acquires the today's point value of the tourist and the total point value, generates the point page data, and sends it to the PC 202 (step S167). The PC 202 receives the point page data from the broker center server 100 and displays it on the display device with the Web browser (step S169).

Figure 28:
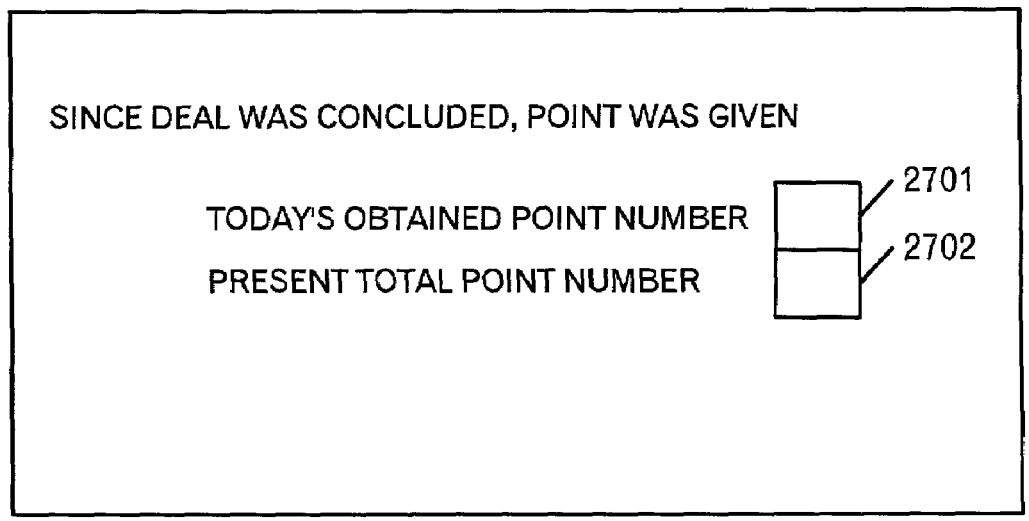
FIG. 28 is a diagram showing an example of a screen for displaying point information for deals.

FIG. 28 shows an example of a display screen of the point page. The example of the display screen of FIG. 28 includes a display column 2701 of the today's obtained point number, and a display column 2702 of the present total point number. Incidentally, in the point table of the transaction related DB 170 shown in FIG. 8, since the information concerning the tourist resort where the deal was conducted and the date of the deal are not recorded each time the point is given, they are not included in the display screen of FIG. 28. However, when they are recorded in the point table or the like, they can be displayed in FIG. 28.

As stated above, the tourist can later confirm the point information for the comment utilization given by registering the comment and being utilized by another tourist, and the point information for the deal given in the case where the deal was conducted by referring to the evaluation information registered by another tourist, and can utilize them for point usage. Besides, when the comment list page as shown in FIG. 26 is displayed, it is possible to analyze what comment is utilized by another tourist, and to use the analysis for future registration of evaluation information.

Figure 29:
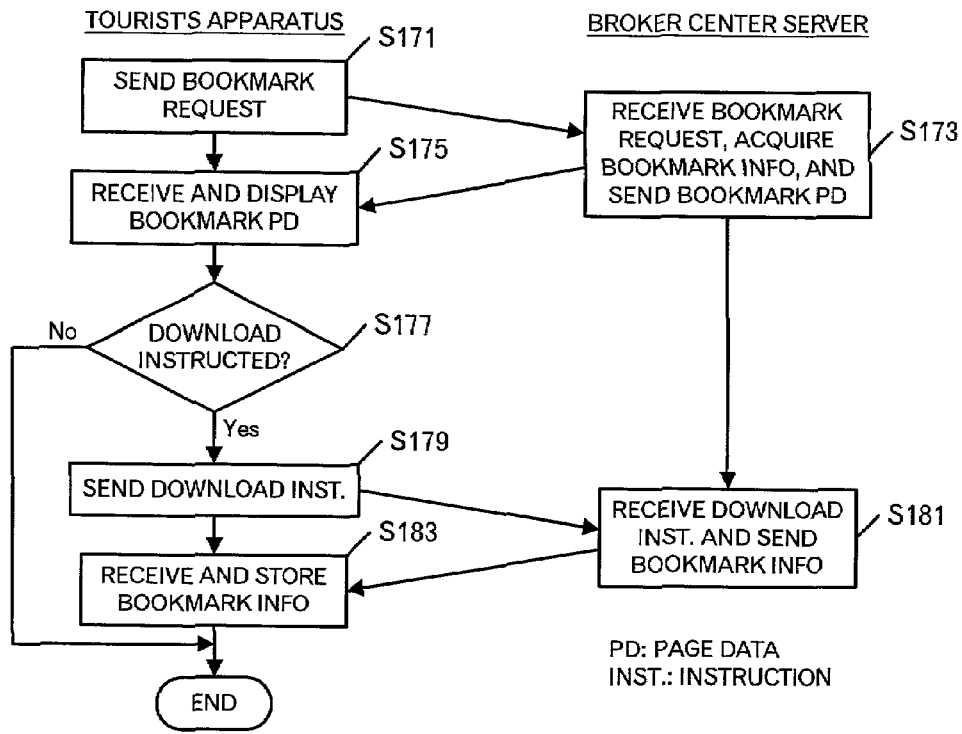
FIG. 29 is a diagram showing a processing flow for downloading bookmark information.
Figure 30:
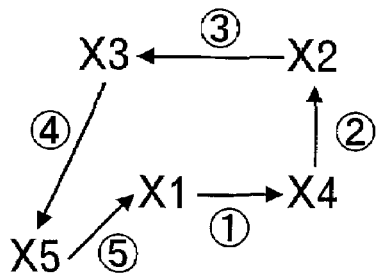
FIG. 30 is a diagram to explain a processing by a map information processor.
Figure 31:
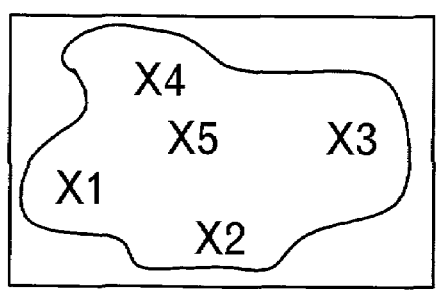
FIG. 31 is a diagram showing an example of map image data sent to a information utilizing tourist terminal from the map information processor.
Figure 32:
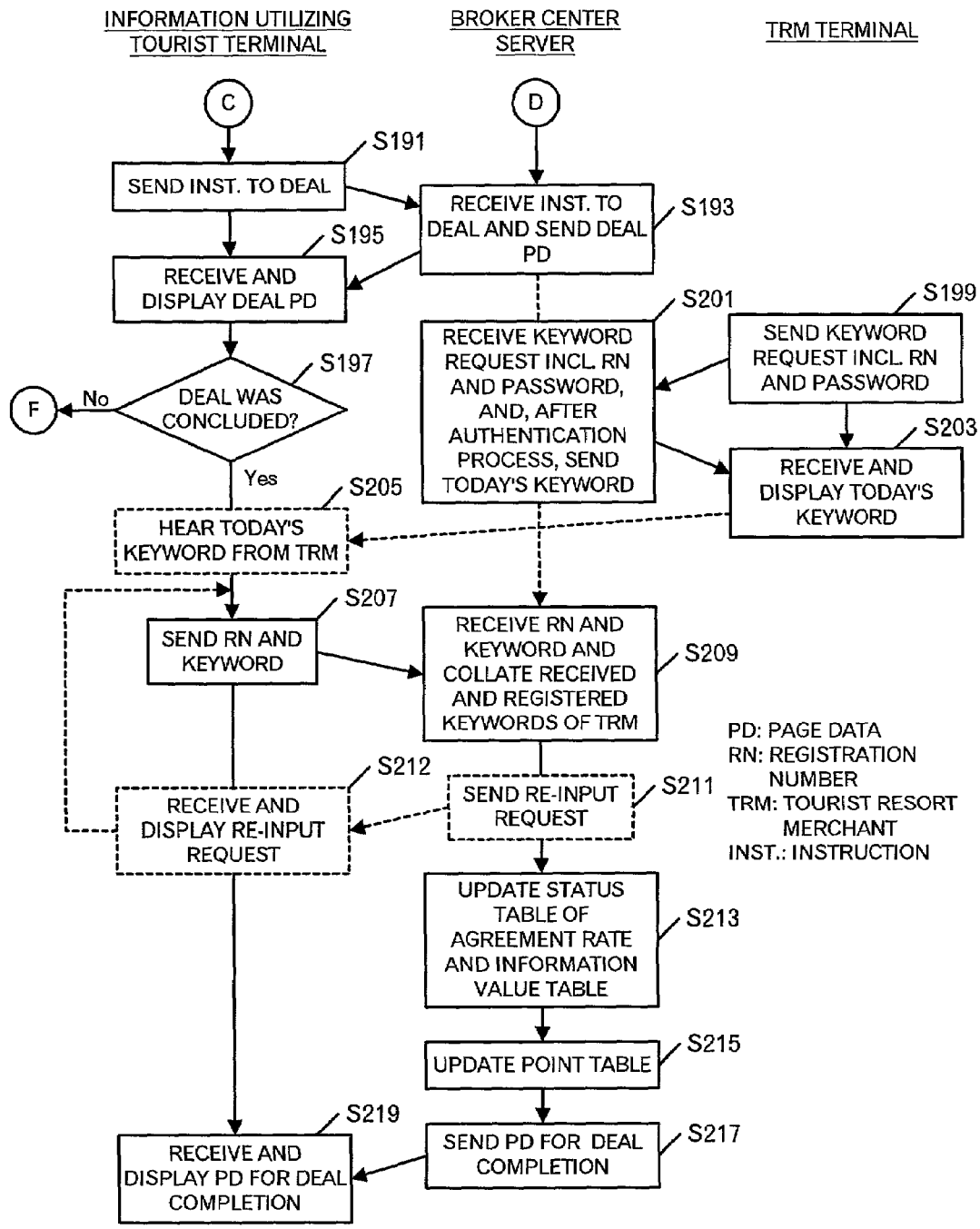
FIG. 32 is a diagram showing a processing flow for a deal processing performed instead of one of FIG. 20.

Next, a processing flow relating to the acquisition of the data bookmarked at the step S67 of FIG. 18 and stored in the bookmark table of the user master DB 110 will be described with reference to FIGS. 29 to 31. The bookmark is registered by, for example, the home PC 304, and in the case of actually visiting a travel destination, it is downloaded in, for example, the cellular phone 301 or the car navigation system 303, and is used for traveling about the tourist resort registered in the bookmark. However, there is also a case where the bookmark registration is made at the travel destination.

The information utilizing tourist B operates, for example, the car navigation system 303 to cause to send an instruction of bookmark request including the user ID to the broker center server 100 (step S171). When receiving the instruction of the bookmark request including the user ID from the car navigation system 303, the map information processor 104 of the broker center server 100 searches the user master DB 110 by the use of the user ID, and acquires the bookmark table of the information utilizing tourist B. Besides, the map information processor 104 uses the comment number included in the bookmark table to search the contents DB 150, acquires the bookmarked comment and the information of the tourist resort in relation to that to generate the bookmark page data, and sends it to the car navigation system 303 (step S173). The car navigation system 303 receives the bookmark page data from the broker center server 303, and displays it on the display device with, for example, the Web browser (step S175). The information utilizing tourist B sees the display of the bookmark page and confirms the contents.

In the case where it is not necessary to further add a bookmark, a download instruction is inputted to the car navigation system 303. In the case where the download instruction is inputted (step S177: Yes route), the car navigation system 303 sends the instruction to download to the broker center server (step S179). When receiving the download instruction from the car navigation system 303, the map information processor 104 of the broker center server 100 sends information of the bookmark table to the car navigation system 303 (step S181). The car navigation system 303 receives the information of the bookmark table from the broker center server 100, and stores it in the storage device (step S183).

Incidentally, the map information processor 104 may carry out a route search process before the download. For example, like the bookmark table of FIG. 5, five bookmarks are registered, and when the positional relation is as shown in FIG. 30, the information of the movement paths may be added in such a manner that first, a movement is made from X1 to X4, next, a movement is made from X4 to X2, a movement is made from X2 to X3, a movement is made from X3 to X5, and a movement is made from X5 to X1 if a return to X1 must be made. Besides, in the car navigation system 303, since the map information is held by the car navigation system 303 itself, map information is not necessary. However, for example, in the case of the cellular phone 301, the PC 304, or the PDA 302, the map image information, and the position information of the bookmarked tourist resorts and the information of the comment numbers are sent. For example, as shown in FIG. 31, the map information including the positional relation of the bookmarked tourist resorts X1 to X5 is sent. Incidentally, there is also a case where the information of the comment numbers or the like is sent separately to facilitate a transition to the process of FIG. 20.

At the step S177, if there is no download instruction (step S177: No route) or the download is ended at the step S183, the process relating to the acquisition of the data stored in the bookmark table is ended.

The downloaded bookmark information is utilized for guiding the information utilizing tourist B to objective places in, for example, the car navigation system 303. By this, the information utilizing tourist B can easily go to the objective tourist resorts even in an unknown place. Since the download has only to be performed, the operation itself of the car navigation system 303 also becomes easy.

Although one embodiment of the invention has been described, the invention is not limited to this. For example, at the step S107 of FIG. 20, such procedure is adopted that the terminal of the information utilizing tourist B is handed to the tourist resort merchant D and at least the password is inputted and sent. However, some tourist may be reluctant to hand the terminal such as the personal cellular phone 201 to a stranger. Accordingly, instead of the processing flow of FIG. 20, a processing flow of FIG. 32 may be carried out.

That is, in the case where the deal button 561 is clicked, the PC 304 sends an instruction to deal to the broker center server 100 (step S191). When receiving the instruction to deal from the PC 304, the usage manager 103 of the broker center server 100 sends deal page data (step S193). The PC 304 receives the deal page data from the broker center server 100, and displays it on the display device (step S195).

Figure 33:
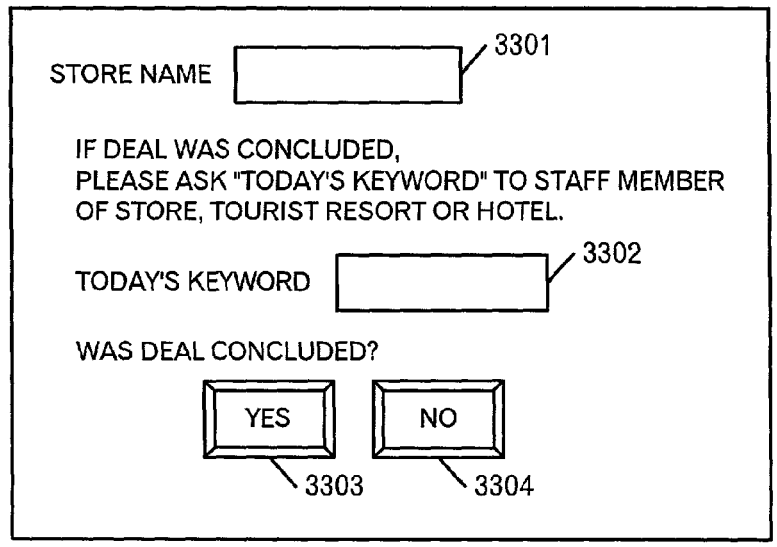
FIG. 33 is a diagram showing an example of a display screen in a case that a keyword is sent at the deal.

FIG. 33 shows an example of a display screen of the deal page data. The example of the display screen of FIG. 33 includes a display column 3301 of a store name, an expression to demand acquisition of "today's keyword" from the tourist resort merchant D or the employee, an input column 3302 of the today's keyword, a YES button 3303 for notifying that deal was concluded, and a NO button 3304 for notifying that deal was not concluded.

In the case where negotiations are conducted between the information utilizing tourist B and the tourist resort merchant D or the employee and the deal is not concluded finally, the NO button 3304 is clicked. In the case where the NO button 3304 is clicked (step S197: No route), the processing proceeds to the processing shown in FIG. 24 from the step S197 through the terminal F.

On the other hand, in the case where the deal is concluded (step S197: Yes route), the today's keyword is got out of the tourist resort merchant D or the employee (step S205). Since the step S205 is an operation of the information utilizing tourist B, it is expressed by a block of a dotted line.

Figure 34:
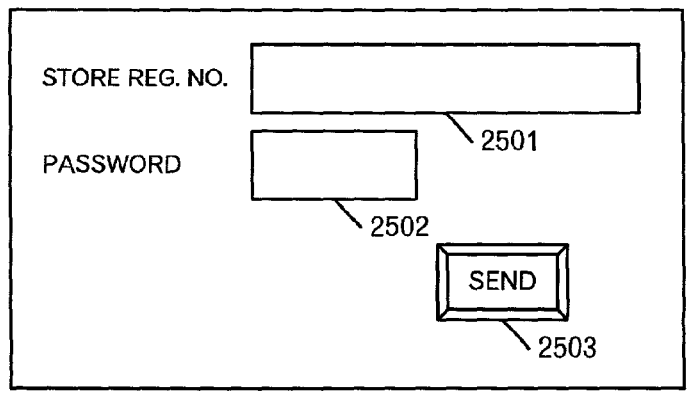
FIG. 34 is a diagram showing an example of a screen in order that the tourist resort merchant inquires a today's keyword.

The tourist resort merchant D sends a keyword request including a registration number and a password to the broker center server 100 by, for example, the terminal 500 of the tourist resort merchant D in advance or at the time when the deal is concluded (step S199). FIG. 34 shows an example of a display screen displayed on the terminal 500 of the tourist resort merchant D at this time. The example of the display screen of FIG. 34 includes an input column 2501 of a store (tourist resort) registration number, an input column 2502 of a password, and a send button 2503. The tourist resort merchant D or the employee inputs the registration number and the password in this screen, and clicks the send button 2503. Then, the keyword request including the inputted registration number and password is sent to the broker center server 100.

Figure 36:
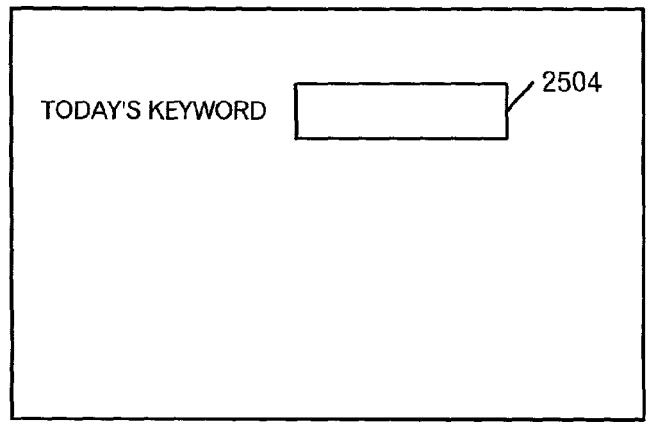
FIG. 36 is a diagram showing an example of a screen for notifying the today's keyword.

When receiving the keyword request including the registration number and the password, the user information manager 105 of the broker center server 100 uses the registration number to search the tourist resort merchant table stored in the user master DB 110, extracts the registered password, and carries out an authentication process using the received password and the registration password. In case where the authentication process is failed, Web page data including a message to indicate failure of the authentication process and for causing the terminal 500 to display the screen shown in FIG. 34 is sent to the terminal 500. If the authentication process is successful, the today's keyword is extracted using the keyword table, and is sent to the terminal 500 of the tourist resort merchant D (step S201). The terminal 500 of the tourist resort merchant D receives the today's keyword from the broker center server 100, and displays it on the display device with the Web browser (step S203). For example, as shown in FIG. 36, a display including a display column 2504 of today's keyword is produced.

FIG. 35 shows an example of the keyword table. The keyword table of FIG. 35 includes a column 3501 of a store name (tourist resort name) or a registration number, a column 3502 of a keyword of Sunday, a column 3503 of a keyword of Saturday, a column 3504 of a keyword of week days, a column 3505 in the case where a tourist is male, a column 3506 of a keyword in the case where a tourist is female, a column 3507 of a keyword in the case of fine weather, a column 3508 of a keyword in the case of cloudy weather, a column 3509 of a keyword in the case of rainy weather, a column 3510 of a keyword in the case where a tourist is a teenager, a column 3511 of a keyword in the case of twenties, a column 3512 of a keyword in the case of thirties, and a column 3513 of a keyword in the case of forties. Incidentally, in the case where the keyword request is sent from the display screen as shown in FIG. 34, since information for specifying the tourist is not inputted, the keywords concerning male or female, and age can not be utilized. However, when more conditions can be inputted in FIG. 34, and are sent to the broker center server 100, the keyword table as shown in FIG. 35 can be effectively used. That is, it becomes easy to prevent unfair use of a keyword.

Incidentally, if the table as stated above is delivered to the respective tourist resort merchants from the broker center server 100 in advance by FAX or the like every week, it becomes unnecessary for the tourist resort merchant D or the employee to make a confirmation every time. Besides, a list including the table as shown in FIG. 34 may be sent in response to the request of the tourist resort merchant D or the employee.

In this way, the tourist resort merchant D or the employee acquires the today's keyword or the keyword for the information utilizing tourist B, and can show the keyword in response to the request from the information utilizing tourist B. When acquiring the keyword from the tourist resort merchant D or the employee, the information utilizing tourist B inputs it to the keyword input column 3302 of FIG. 33, and clicks the YES button 3303. In the case where the YES button 3303 is clicked, the PC 304 sends the registration number (or tourist resort name (store name)) and the keyword to the broker center server 100 (step S207). The usage manager 103 of the broker center server 100 receives the registration number (or the tourist resort name (store name)) and the keyword, searches the keyword table of the user master DB 110 by the use of the registration number or the like to read out a registered keyword to be applied, and uses the received keyword and the registered keyword to carry out a collation process (step S209). Incidentally, there is also a case where the registration number and the tourist resort name are not sent at the step S207. This is because the registration number and the tourist resort name are specified before this.

In the case where the collation process is failed, a re-input request of the keyword is sent to the PC 304 (step S211). The PC 304 displays the re-input request of the keyword on the display device, together with an expression such as "Keyword is wrong" (step S212), and returns to the step S207. Incidentally, in the case where the collation process is failed three or more times, the process may be terminated.

In the case where the collation process is successful, the usage manager 103 updates the status table of the agreement rate and the information value table of the transaction related DB 170 (step S213). That is, in the status table of the agreement rate, correspondingly to the registration number of the tourist resort, the agreement number on the agreement date is incremented by one, the total agreement number is also incremented by one, and they are registered in the table. Besides, correspondingly to the comment number of the evaluation information specified in FIG. 17 and the comment number of the evaluation information in which the check box of the point grant in FIG. 16 is checked, the utilization number on the utilization date is incremented by one, the total utilization number is also incremented by one, and they are registered in the table.

Besides, the user information manager 105 updates the point table of the transaction related DB 170 (step S215). That is, in the point table of the transaction related DB 170, with respect to the records of the informant tourist A registering the evaluation information specified in FIG. 17 and the information utilizing tourist B conducting the deal presently, a point value on the point grant date is incremented by a predetermined value, the total point value is incremented by the predetermined value, and they are registered in the table. In response to the update of the point table, the user information manager 105 sends the notice including the information concerning the point value given this time and the total point value to the informant tourist A and the information utilizing tourist B by mail or another method. However, there is also a case where sending of the notice is not carried out.

Then, the usage manager 103 sends page data for completion of a deal to the PC 304 (step S217). The PC 304 receives the page data for completion of the deal from the broker center server 100, and displays it on the display device with the Web browser (step S219).

As stated above, by carrying out the process of FIG. 33, the information utilizing tourist B increases the utilization degree number of the evaluation information without handing the terminal to the tourist resort merchant D etc. and with the information which can be known only by the tourist resort merchant D. Thus, the reliable utilization degree number as compared with the conventional art can be acquired and provided.

Although the embodiments of the invention have been described, the invention is not limited to these. For example, the screen examples of FIGS. 12, 14, 15, 16, 17, 19, 21, 22, 23, 26, 27, 28, 33, 34, 36 have the premise that a relatively large display region can be used, however, it is often difficult to display all on a display device of, for example, the cellular phone at the same time. Accordingly, in accordance with a terminal utilized by a tourist, for example, each of these display screens may be divided into a plurality of display screens for display easy to see.

The data structure examples of FIGS. 3 to 10 and FIG. 35 are merely examples, and similar or more information may be managed by another data structure. Further, the division of the function blocks of the broker center server 100 shown in FIG. 2 is merely an example, and it may not be coincident with actual program modules.

In the above description, although there has been described such a configuration that evaluation information is registered through the Web page, there is also a case where the registration is enabled by mail. By this, the informant tourist A can easily provide information. Besides, although the screen example to request the input of the ID is shown, there is also a case where the input of the user ID is omitted by using a subscriber ID or IPv6. With respect to the input column of the user ID, there is also a case where the Web page data is generated, sent, and displayed in the state where the user ID is embedded. Besides, a GPS function is provided in a cellular phone of a tourist, and there may be further provided means of judging, on the basis of the position information of the tourist and the position information of the tourist resort merchant, whether or not the tourist is actually in the vicinity of the tourist resort merchant at the point of time of comment input. For example, it is judged whether the position information of the tourist is within a predetermined distance from the position information of the tourist resort merchant, and if it is within the predetermined distance, the comment is made effective.

What is claimed is:

1. A computer-implemented method, executed by a user terminal of a user, comprising:

after a face to face deal was concluded between said user and a specific business entity without connection between a server and any terminals of said specific business entity, and an identification (ID) of evaluation information for said specific business entity was sent from said user terminal of said user to said server, which identified a user ID of said user, and an ID of said specific business entity based on data received from said user terminal of said user, receiving from said server, a request for inputting a password which is to be input by a person who belongs to said specific business entity;

accepting and sending to said server, an input of said password from said person who belongs to said specific business entity; and receiving from said server and displaying, information associated with a result of comparison processing between the sent password and a password pre-registered in association with said ID of said specific business entity in a database in said server, without using said ID of said user.

2. A computer-implemented method, executed by a user terminal of a user, comprising:

after a face to face deal was concluded between said user and a specific business entity without connection between a server and any terminals of said specific business entity, and an identification (ID) of evaluation information for a specific business entity was sent from said user terminal of said user to said server, which identified a user ID of said user, and an ID of said specific business entity based on data received from said user terminal of said user, receiving from said server, a request for inputting a password acquired from a person who belongs to said specific business entity;

accepting and sending to said server, an input of said password acquired from said person who belongs to said specific business entity; and receiving from said server and displaying, information associated with a result of comparison processing between the sent password and a password pre-registered in association with said ID of said specific business entity in a database in said server, without using said ID of said user.

3. A computer-implemented method, executed by a server, for handling evaluation information, comprising:

identifying a user identification (ID) of a user who uses a user terminal to access said server;

receiving from said user terminal of said user, an ID of evaluation information for a specific business entity;

identifying an ID of said specific business entity based on data received from said user terminal of said user;

receiving from said user terminal of said user, a password of said business entity, which is acquired from a person who belongs to said specific business entity after a face to face deal was concluded between said user and said specific business entity without connection between said server and any terminals of said specific business entity;

comparing the received password with a password, which is pre-registered in a database and corresponds to said ID of said specific business entity, without using said user ID; and upon success of the comparison, updating a number of effective utilization times for said evaluation information.

4. The computer-implemented method as set forth in claim 3, further comprising performing a processing to give a predetermined point to at least one of a person who registered said evaluation information and said user, upon detecting that collation processing succeeds.

5. The computer-implemented method as set forth in claim 3, further comprising, at search of a business entity or evaluation information, sending said number of effective utilization times for said evaluation information to a terminal of a searcher to indicate effectiveness of said evaluation information.

6. The computer-implemented method as set forth in claim 3, further comprising:

upon detecting that evaluation information for a certain business entity was received from an evaluator terminal, judging whether or not said certain business entity has been registered;

upon detecting that said certain business entity is unregistered, provisionally registering said certain business entity; and upon detecting that said certain business entity is unregistered, sending provisional registration notice including provisional password to a person who belongs to said certain business entity.

7. The computer-implemented method as set forth in claim 3, further comprising:

upon detecting that the comparison succeeds, judging whether or not said specific business entity is registered provisionally; and upon detecting that said specific business entity is registered provisionally, updating the provisional registration of the specific business entity to the regular registration.

8. A program embodied on a computer readable medium for causing a computer to perform an information processing as to evaluation information, said program comprising:

identifying a user identification (ID) of a user who uses a user terminal to access said server;

receiving from said user terminal of said user, an ID of evaluation information for a specific business entity;

identifying an ID of said specific business entity based on data received from said user terminal of said user;

receiving from said user terminal of said user, a password of said business entity, which is acquired from a person who belongs to said specific business entity after a face to face deal was concluded between said user and said specific business entity without connection between said server and any terminals of said specific business entity;

comparing the received password with a password, which is pre-registered in a database and corresponds to said ID of said specific business entity, without using said user ID; and upon success of the comparison, updating a number of effective utilization times for said evaluation information.

9. The program embodied on a computer readable medium as set forth in claim 8, further comprising performing a processing to give a predetermined point to at least one of a person who registered said evaluation information and said user, upon detecting that collation processing succeeds.

10. The program embodied on a computer readable medium as set forth in claim 8, further comprising at search of a business entity or evaluation information, sending said number of effective utilization times for said evaluation information to a terminal of a searcher to indicate effectiveness of said evaluation information.

11. The program embodied on a computer readable medium as set forth in claim 8, further comprising:

upon detecting that evaluation information for a certain business entity was received from an evaluator terminal, judging whether or not said certain business entity has been registered;

upon detecting that said certain business entity is unregistered, provisionally registering said certain business entity; and upon detecting that said certain business entity is unregistered, sending provisional registration notice including provisional password to a person who belongs to said certain business entity.

12. The program embodied on a computer readable medium, as set forth in claim 8, further comprising:
   upon detecting that the comparison succeeds, judging whether or not said specific business entity is registered provisionally; and
   upon detecting that said specific business entity is registered provisionally, updating the provisional registration of the specific business entity to the regular registration.

13. A computer system comprising:
   means for identifying a user identification (ID) of a user who uses a user terminal to access said server;
   means for receiving from said user terminal of said user, an ID of evaluation information for a specific business entity;
   means for identifying an ID of said specific business entity based on data received from said user terminal of said user;
   means for receiving from said user terminal of said user, a password of said business entity, which is acquired from a person who belongs to said specific business entity after a face to face deal was concluded between said user and said specific business entity without connection between said server and any terminals of said specific business entity;
   means for comparing the received password with a password, which is pre-registered in a database and corresponds to said ID of said specific business entity, without using said user ID; and
   means for updating a number of effective utilization times for said evaluation information, upon success of the comparison.

14. The computer system as set forth in claim 13, further comprising:
   means for performing a processing to give a predetermined point to at least one of a person who registered said evaluation information and said user, upon detecting that collation processing succeeds.

15. The computer system as set forth in claim 13, further comprising:
   means for sending, at search of a business entity or evaluation information, said number of effective utilization times for said evaluation information to a terminal of a searcher to indicate effectiveness of said evaluation information.

16. The computer system as set forth in claim 13, further comprising:
   means for judging whether or not said certain business entity has been registered, upon detecting that evaluation information for a certain business entity was received from an evaluator terminal;
   means for provisionally registering said certain business entity, upon detecting that said certain business entity is unregistered; and
   means for sending provisional registration notice including provisional password to a person who belongs to said certain business entity, upon detecting that said certain business entity is unregistered.

17. The computer system as set forth in claim 13, further comprising:
   means for judging whether or not said specific business entity is registered provisionally upon detecting that the comparison succeeds; and
   means for updating the provisional registration of the specific business entity to the regular registration upon detecting that said specific business entity is registered provisionally.

\* \* \* \* \*